United States Patent
Ihara et al.

(10) Patent No.: US 7,103,840 B2
(45) Date of Patent: Sep. 5, 2006

(54) EFFECT ADDING DEVICE, EFFECT ADDING METHOD, EFFECT ADDING PROGRAM, STORAGE MEDIUM WHERE EFFECT ADDING PROGRAM IS STORED

(75) Inventors: Keigo Ihara, Tokyo (JP); Takanori Nishimura, Kanagawa (JP); Junko Fukuda, Kanagawa (JP); Keiichi Yoshioka, Tokyo (JP); Shin Shiroma, Tokyo (JP); Takahiko Sueyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 617 days.

(21) Appl. No.: 10/089,096

(22) PCT Filed: Aug. 29, 2001

(86) PCT No.: PCT/JP01/07416

§ 371 (c)(1),
(2), (4) Date: Apr. 12, 2002

(87) PCT Pub. No.: WO02/19705

PCT Pub. Date: Mar. 7, 2002

(65) Prior Publication Data
US 2002/0163531 A1    Nov. 7, 2002

(30) Foreign Application Priority Data
Aug. 30, 2000  (JP) .............................. 2000-261853
Jul. 3, 2001   (JP) .............................. 2001-230473

(51) Int. Cl.
*G11B 27/00* (2006.01)
*G11B 27/028* (2006.01)
(52) U.S. Cl. ..................... 715/726; 715/716
(58) Field of Classification Search ................ 715/726, 715/723, 837; 386/52, 4; 348/231.99, 239
See application file for complete search history.

(56) References Cited

U.S. PATENT DOCUMENTS

| | | | | |
|---|---|---|---|---|
| 5,228,859 A | * | 7/1993 | Rowe | 434/118 |
| 5,469,536 A | * | 11/1995 | Blank | 345/594 |
| 5,539,527 A | * | 7/1996 | Kajimoto et al. | 386/52 |
| 5,592,602 A | * | 1/1997 | Edmunds et al. | 345/474 |
| 5,664,216 A | * | 9/1997 | Blumenau | 715/500.1 |
| 5,668,639 A | * | 9/1997 | Martin | 380/52 |
| 5,982,350 A | * | 11/1999 | Hekmatpour et al. | 345/629 |
| 5,999,190 A | * | 12/1999 | Sheasby et al. | 345/589 |
| 6,154,600 A | * | 11/2000 | Newman et al. | 386/4 |
| 6,154,601 A | * | 11/2000 | Yaegashi et al. | 386/52 |
| 6,204,840 B1 | * | 3/2001 | Petelycky et al. | 715/500.1 |

(Continued)

FOREIGN PATENT DOCUMENTS

EP      0 969 390      1/2000

(Continued)

*Primary Examiner*—Weilun Lo
*Assistant Examiner*—Steven B. Theriault
(74) *Attorney, Agent, or Firm*—Oblon, Spivak, McClelland, Maier & Neustadt, P.C.

(57) ABSTRACT

The present invention is capable of easily and quickly selecting and applying desired effects. In the present invention, single-shot effects and continuous effects for specifying special effects for images are arranged and displayed in the order of use in a single-effect display area 105A and a continuous effect display area 105B of an effect list display area 105, so that the user can easily and quickly select a single-shot effect and a continuous effect to apply desired special effects, in order to easily and quickly apply the desired special effects to input image at desired timing.

19 Claims, 15 Drawing Sheets

U.S. PATENT DOCUMENTS

| | | | |
|---|---|---|---|
| 6,317,142 B1 * | 11/2001 | Decoste et al. | 715/762 |
| 6,373,499 B1 * | 4/2002 | Acker | 345/619 |
| 6,392,710 B1 * | 5/2002 | Gonsalves et al. | 348/578 |
| 6,414,686 B1 * | 7/2002 | Protheroe et al. | 345/474 |
| 6,504,552 B1 * | 1/2003 | Phillips | 715/726 |
| 6,546,187 B1 * | 4/2003 | Miyazaki et al. | 386/52 |
| 6,546,188 B1 * | 4/2003 | Ishii et al. | 386/52 |
| 6,621,504 B1 * | 9/2003 | Nadas et al. | 715/723 |
| 6,744,968 B1 * | 6/2004 | Imai et al. | 386/52 |
| 6,826,729 B1 * | 11/2004 | Giesen et al. | 715/837 |
| 6,928,613 B1 * | 8/2005 | Ishii et al. | 715/726 |
| 2001/0008572 A1 * | 7/2001 | Ohmori et al. | 386/52 |
| 2001/0020953 A1 * | 9/2001 | Moriwake et al. | 345/723 |
| 2001/0029522 A1 | 10/2001 | Yoshimine | |
| 2002/0016848 A1 | 2/2002 | Yoshimine | |
| 2002/0026512 A1 | 2/2002 | Nishimura | |
| 2002/0038359 A1 | 3/2002 | Ihara | |
| 2002/0046097 A1 | 4/2002 | Yoshimine | |
| 2002/0052917 A1 | 5/2002 | Ihara | |
| 2002/0052961 A1 | 5/2002 | Yoshimine | |
| 2002/0138827 A1 | 9/2002 | Yoshimine | |
| 2002/0152313 A1 | 10/2002 | Nishimura | |
| 2002/0156648 A1 | 10/2002 | Yoshimine | |
| 2002/0156660 A1 | 10/2002 | Nishimura | |
| 2002/0163531 A1 | 11/2002 | Ihara et al. | |
| 2002/0175917 A1 * | 11/2002 | Chakravarty et al. | 345/473 |

FOREIGN PATENT DOCUMENTS

| | | |
|---|---|---|
| JP | 10-322646 | 12/1998 |
| JP | 11-98412 | 4/1999 |
| JP | 2000-23080 | 1/2000 |
| JP | 2000-125191 | 4/2000 |

* cited by examiner (A) PHOTOGRAPHING MODE SCREEN (B) RELATION BETWEEN GUI OF PHOTOGRAPHING MODE SCREEN AND CONTENTS OF OPERATION OF JOG DIAL (A) WHOLE STRUCTURE OF UPLOAD MODE SCREEN (C) SUB GUI IN UPLOAD MODE (B) GUI IN UPLOAD MODE (A) WHOLE STRUCTURE OF WEB CONFIRMATION MODE SCREEN (B) GUI IN WEB CONFIRMATION MODE (A) LIVE RESERVATION/CONFIRMATION MODE SCREEN (B) GUI IN LIVE CONFIRMATION MODE

EFFECT ADDING DEVICE, EFFECT ADDING METHOD, EFFECT ADDING PROGRAM, STORAGE MEDIUM WHERE EFFECT ADDING PROGRAM IS STORED

TECHNICAL FIELD

The present invention relates to an effect applying device, effect applying method, effect applying program and effect applying program storage medium, and for example, is suitably applied to an effect applying device, effect applying method, effect applying program and effect applying program storage medium which are for applying effects to motion pictures in real time.

BACKGROUND ART

Heretofore, in general, to edit taken images by means of a video camera includes addition of letter information (title) to the taken images and applying of effects such as change of color to them.

In addition, a recent video camera has an effect applying function for applying effects to taken images in photographing and reproduction, which allows unskilled users to easily apply effects to images being taken, during photographing.

By the way, in an effect (effect) applying device having such effect applying function, a user can select desired effects with plural operating buttons provided in correspondence with various effects, which presents a problem in that it is difficult for unskilled users to quickly select operating buttons corresponding to desired effects.

In addition, in the effect applying device, if the operating buttons are fewer than effects, desired effects has to be selected by operating the operating buttons several times, which presents a problem in that various effects can not be selected sequentially in a short time and therefore it is difficult to sequentially apply various effects to images being taken in real time.

DESCRIPTION OF THE INVENTION

The present invention is made in view of the above points and intends to propose an effect applying device, effect applying method, and effect applying program and effect applying program storage medium which are capable of simply and quickly selecting and applying desired effects.

To solve such problems, in this invention, effect specifying information for specifying effects for images is displayed in a preset arrangement, and when desired effect specifying information are selected out of the effect specifying information being displayed, the effects specified by the selected effect specifying information are applied to input images.

Thereby, the effect specifying information for specifying effects for images can be displayed in the arrangement which is an order of use, and thus a user can simply and quickly select desired effects to apply the desired effects to input images at desired timing.

BEST MODE FOR CARRYING OUT THE INVENTION

Hereinafter, an embodiment of this invention will be described with reference to the drawings.

Figure 1:
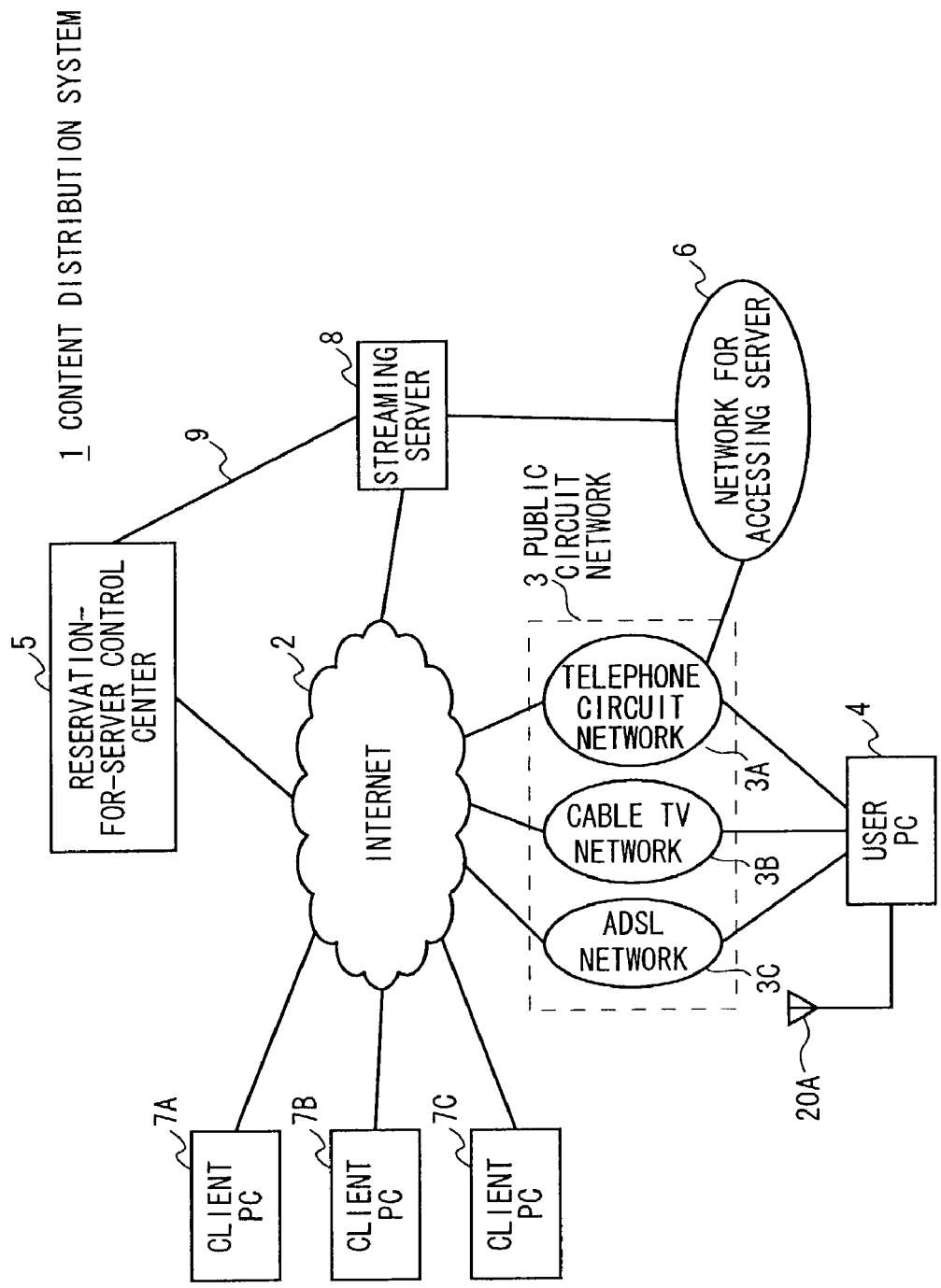
FIG. 1 is a schematic block diagram showing the whole configuration of a content distribution system according to one embodiment of the present invention.

(1) Content Distribution System (1-1) Whole Configuration of Content Distribution System Referring to FIG. 1, reference numeral 1 shows a content distribution system and a personal casting service which will be described later is offered in the content distribution system 1.

This content distribution system 1 comprises a user PC (Personal Computer) 4 connected to the Internet 2 via an ISP (Internet Service Provider) which is not shown in the figure, with a public circuit network 3 (telephone circuit network 3A, cable television network 3B or ADSL (Asymmetric Digital Subscriber Line) network 3C), a reservation-for-server control center 5 which is connected to the Internet 2, and a streaming server 8 for distributing a content stream which is received from the user PC 4 via the public circuit network 3 or a network for accessing server 6, to a plurality of client PCs 7A, 7B and 7C over the Internet 2.

In this condition, when the user PC 4 transmits content to the streaming server 8, it makes, for example, the PPP (Point to Point Protocol) connection to an access port of the network for accessing server 6 via the telephone circuit network 3A of the public circuit network 3, to establish a transmission path to the streaming server 8, thus making it possible to accurately transmit the content to the steaming server 8 through the transmission path.

It is noted that the user PC 4 can perform Internet connection to the streaming server 8 via the public circuit network 3, an ISP and the Internet 2, and in this case, the user PC 4 can transmit content to the streaming server 8 through a transmission path which is arbitrarily selected out of the connectable telephone circuit network 3A, cable television network 3B and ADSL network 3C.

The streaming server 8 can distribute the content stream received via the network for accessing server 6 or the Internet 2 from the user PC 4, to the plurality of client PCs 7A, 7B, and 7C over the Internet 2.

Further, the streaming server 8 is connected to the reservation-for-server control center 5 with a dedicated line 9 in order to transmit identification data back and forth with the reservation-for-server control center 5 through the dedicated line 9 when the user PC 4, client PC 7A, 7B or 7C is to be identified.

Actually, the user PC 4 requests the reservation-for-server control center 5 to reserve the streaming distribution function of the streaming server 8 for a desired time zone, in order to register the reservation in the streaming server 8 via the reservation-for-server control center 5.

When the reserved time zone which has been reserved and registered by the user PC 4 comes, the streaming server 8 receives and stores content transmitted from the user PC 4, in a buffer via the network for accessing server 6, and at the same time, takes out the content, and distributes the content stream to the requesting client PCs 7A, 7B and 7C.

In this way, the content distribution system 1 can realize personal broadcasting, that is, the personal casting service, in which content transmitted from the user PC 4 is distributed to the client PCs 7A, 7B, and 7C via the streaming server 8 for a predetermined reserved time zone in real time.

Note that, this embodiment will describe the case of using the streaming server 8 with the streaming distribution function, but a server with other kinds of functions may be used to provide content as long as it can distribute content in real time.

(1-2) Configuration of User PC

Next, the configuration of the user PC 4 which is used to transmit, for example, live content taken by a user who is distributor, to the streaming server 8, will be described.

Figure 2:
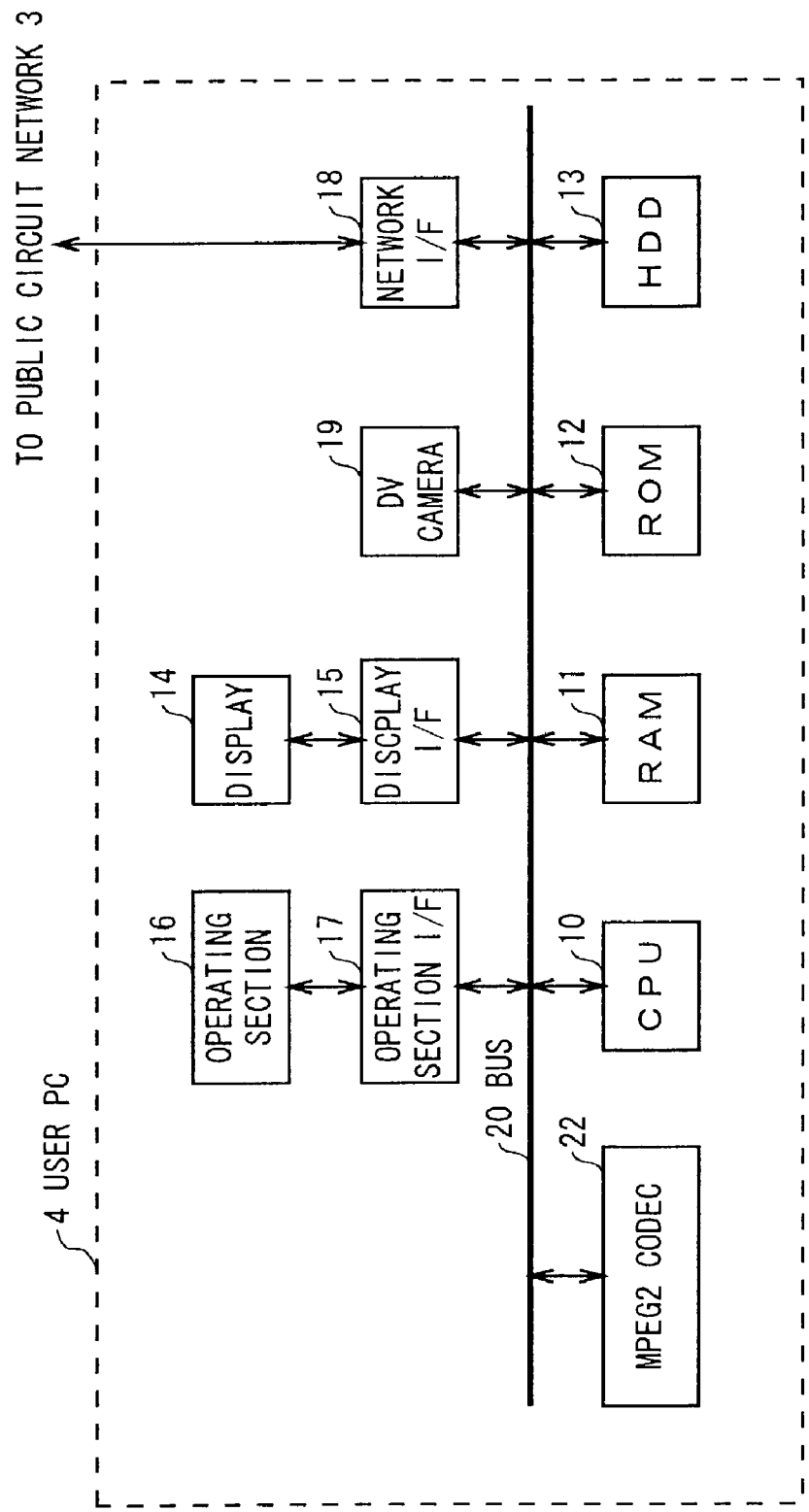
FIG. 2 is a block diagram showing a circuit configuration of a user PC.

As shown in FIG. 2, the user PC 4 comprises a CPU (Central Processing Unit) 10 for executing various calculation processing and for controlling each unit, a RAM (Random Access Memory) 11 used as a work area of the CPU 10, a ROM (Read Only Memory) 12 for storing a series of programs which are executed by the CPU 10, a hard disk 13 for storing an operating system (for example, "Windows 95/98/2000" (Microsoft Corp.) and a set of programs including application programs which are executed by the CPU 10, a display 14 which is a liquid crystal display to receive and display processing results from the CPU 10 via a bus 20 and a display interface 15, an operating section 16 used by a user to enter commands, composed of operating buttons including a keyboard, a mouse, and a jog dial that can be rotated, turned and pressed, which will be described later, an operating section interface 17 for transmitting a command inputted with the operating section 16 to the CPU 10 through the bus 20, a network interface 18 for communicating data back and forth with an external device connected to the Internet 2 (FIG. 1) or the network for accessing server 6 via the public circuit network 3, a digital video camera 19 attached to the user PC 4 in one body, and an MPEG 2 codec 22 for compression-coding content by the MPEG (Moving Picture Experts Group) 2 standard. It should be noted that the hard disk 13 is also used by the CPU 10 to record and take out data and to store content and various control data.

Figure 3:
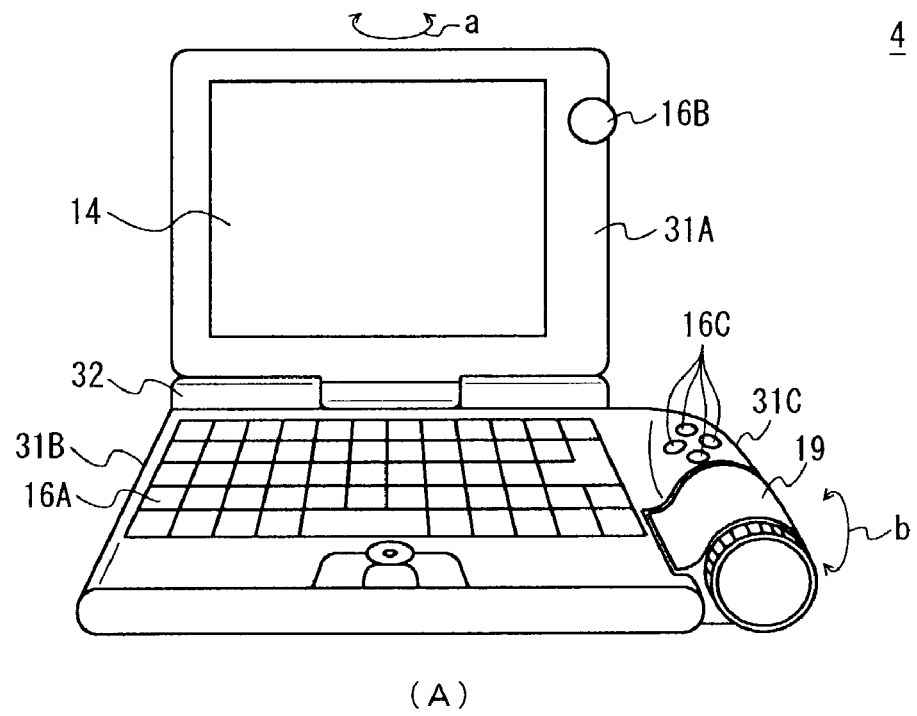
FIG. 3 is a schematic perspective view (1) showing an external constitution of the user PC.
Figure 3:
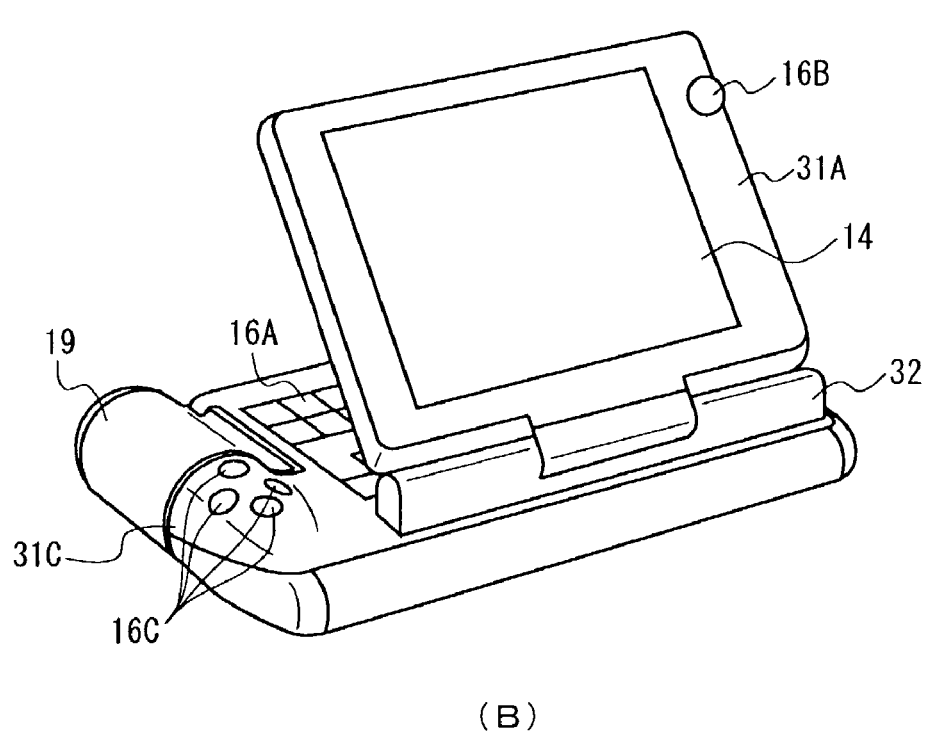

The user PC 4 is composed of a display body 31A having the display 14 which is a liquid crystal display and a keyboard body 31B provided with a keyboard 16A, and these bodies are connected to each other so as to be opened and closed at a hinge 32, as shown in FIG. 3(A).

The display body 31A is attached to the keyboard body 31B so as to be turned in a direction shown by the arrow a, and as shown in FIG. 3(B), the user PC 4 can be used with the display body 31A turned by 180 degrees, and a jog dial 16B which can be rotated, turned, and pressed is provided on the upper right edge of the display body 31A.

As to the keyboard body 31B, an operating button body 31C provided with plural (four) operating buttons 16C is attached and fixed to the right side of the keyboard body 31B, and the digital video camera 19 is supported at one point on the right side so that it can be turned in the direction shown by an arrow b.

Figure 4:
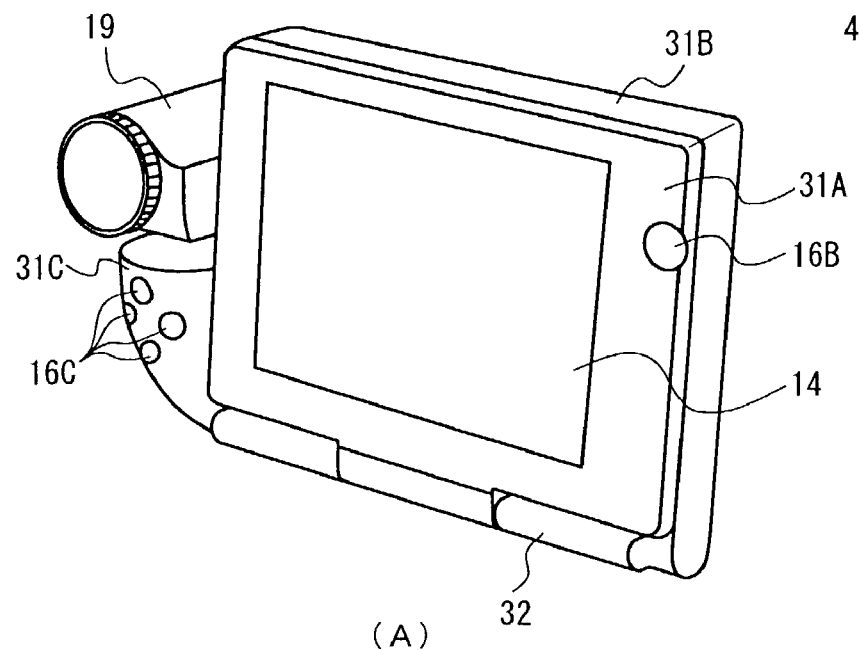
FIG. 4 is a schematic perspective view (2) showing an external constitution of the user PC.
Figure 4:
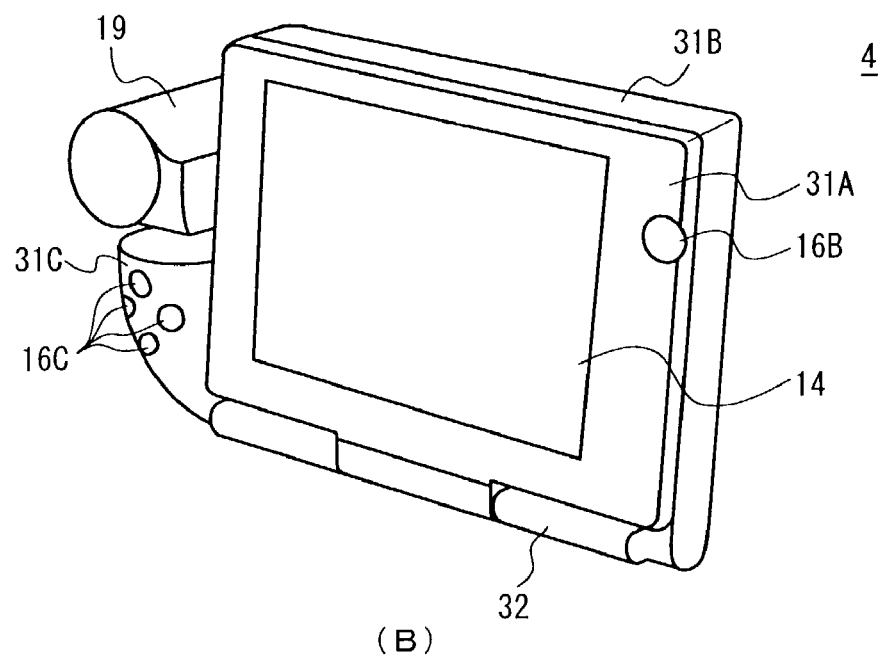

It is noted that the user PC 4 in a style shown in FIG. 4(A) can be used and in this situation, a user can hold the user PC 4 and takes a picture of the user himself with the digital camera 19. In this case, the user can photograph the user himself while viewing the taken images on the display 14 because the display 14 faces the user.

In this case, however, it is difficult for the user to accurately operate the keyboard 16A because the keyboard 16A is behind the display 14.

Taking this point into consideration, in the user PC 4, photographing with the digital video camera 19 and photograph-related commands (commands including photographing start, stop, zoom, apply of effects, storing and transmission of content, for example) can be inputted by operating the jog dial 16B and the operating buttons 16C.

Further, the user PC 4 in a style shown in FIG. 4(B) can be used, and in this case, the user can hold the user PC 4 and can photograph a front subject with the digital video camera 19 while viewing it on the display 14.

In actual, when the power of the user PC 4 is turned on, the CPU 10 takes out and executes a set of various application programs stored in the ROM 12 and the hard disk 13, in order to perform various processing, such as photographing processing, processing for applying special effects to content, transmission processing of content to the streaming server 8, and browsing of WWW (World Wide Web).

(1-3) Functions of User PC

Figure 5:
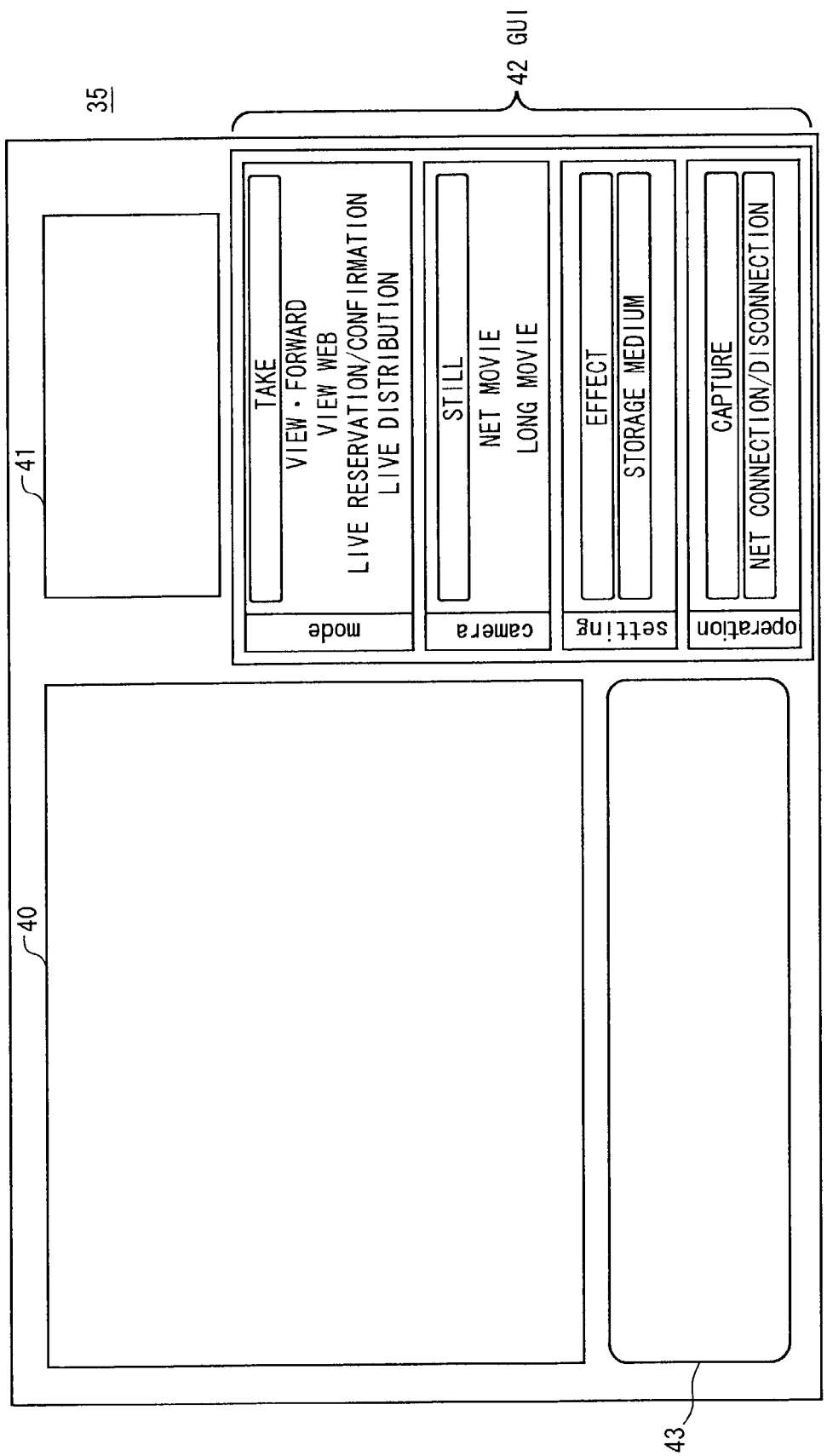
FIG. 5 is a schematic view showing an initial screen when the user PC starts application programs.

Hereinafter, various functions that the CPU 10 of the user PC 4 carries out by executing predetermined processing in accordance with the aforementioned set of application programs will be specifically described. At first, the user PC 4 displays an initial screen 35 as shown in FIG. 5 on the display 14 under the control of the CPU 10.

The initial screen 35 has a main video display area 40 of a big size for displaying images taken with the digital video camera 19, and a sub video display area 41 of a small size for displaying preview of a last-shot image which was taken in the last time photographing, and also has a GUI (Graphical User Interface) 42 which allows a usr to select higher-ranked items including a mode (mode), the kind of image (camera), setting (setting), and a command (operation), under the sub video display area 41, and a status window 43 for showing the status of the user PC 4 under the sub video display area 40.

The higher-ranked item "mode" in the GUI 42 is composed of five kinds modes: a photographing mode (a mode in the case of selecting "take"); an upload mode (a mode in the case of selecting "view/forward"); a Web confirmation mode (a mode in the case of selecting "view Web"); a live reservation/confirmation mode (a mode in the case of selecting "live reservation/confirmation"); and a live distribution mode (a mode in the case of selecting "live distribution", as selectable items. It is noted that the photographing mode is selected as an initial status when the user PC 4 starts.

This photographing mode is a mode to photograph subjects with the digital video camera 19 of the user PC 4. Then, in the case of selecting the photographing mode or in an initial status, the CPU 10 displays a photographing mode screen 50 shown in FIG. 6(A) on the display 14.

This photographing mode screen 50 has a main video display area 60 and a sub video display area 61, like the aforementioned initial screen 35 (FIG. 5), and images being taken is displayed in the main video display area 60 and a last-shot image which was taken in the last time photographing is displayed in the sub video display area 61.

In addition, the photographing mode screen 50 has a GUI 62, like the initial screen 35, and as shown in FIG. 6(B), the GUI 62 has higher-ranked items including "mode", "camera", "setting" and "operation".

Each higher-ranked item has a plurality of lower-ranked items and a lower-ranked item is selected by moving a focus F shown by a bold line to a desired lower-ranked item through the turning operation of the jog dial 16B on the display body 31A and then pressing the jog dial 16B.

In addition, in the photographing mode, a predetermined command (a command for selecting and determining an effect item to apply special effects to images in photographing, for example) is previously assigned to the operating buttons 16C (FIG. 3 and FIG. 4) provided on the operating button body 31C.

As described above, the user can execute various operations in the photographing mode by only operating the jog dial 18B and the operating buttons 16C, without using the keyboard 16A, and thus the user can easily execute the photographing operations under such a condition as shown in FIGS. 4(A) and (B) where the keyboard 16A is difficult to operate.

Note that, in the photographing mode, commands for selecting and determining effect items to apply special effects to images in photographing are previously assigned to the operating buttons 16C as default. On the contrary, however, arbitrary commands may be assigned to the operating buttons 16C, or other kinds of commands may be assigned to the operating buttons 16C in another mode. Therefore, the operability of the user PC 4 can be significantly improved in this case.

In addition, the status window 63 in the photographing mode shows a present status of the user PC 4 (for example, the battery level and the remaining storage capacity of the hard disk 13), and the processing condition in a mode being selected (for example, the size of picture data being taken, a specified storage medium for picture data, the kinds of commands which are assigned to the operating buttons 16C).

By the way, in the photographing mode, a server on the network can be designated as a storage medium for picture data, instead of the hard disk 13. In this case, the streaming server 8 in the content distribution system 1 is designated as a storage medium, and then picture data is transferred to the streaming server 8 over the Internet 2 by the selection operation of the "capture" button with the focus F.

Figure 7:
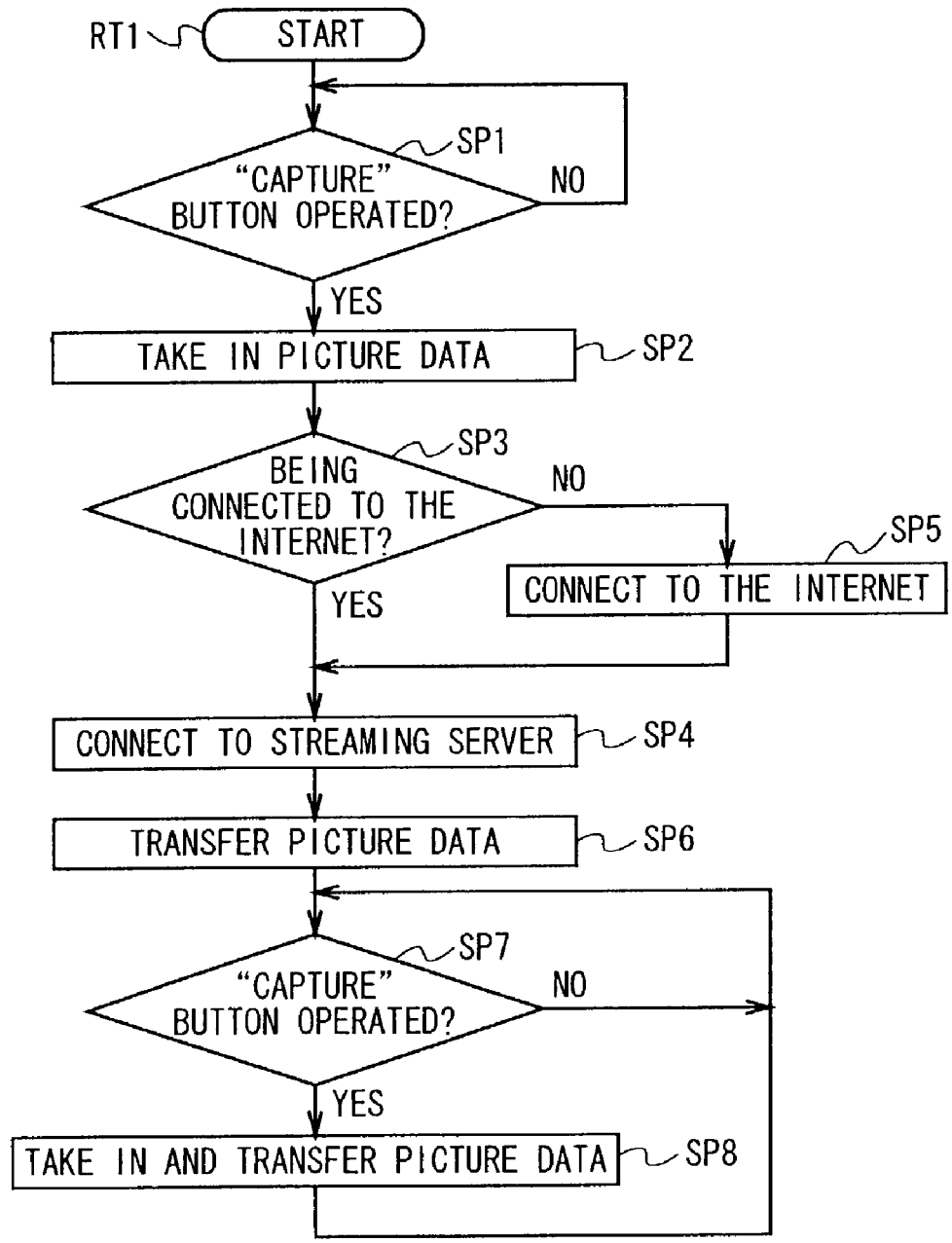
FIG. 7 is a flowchart showing a procedure of a picture data transferring processing.

In actual, the CPU 10 of the user PC 4 starts the routine RT1 at start step and moves to next step SP1 as shown in FIG. 7. At step SP1, in the case where the streaming server 8 is designated as a storage medium for picture data of content taken in a photographing mode, the CPU 10 of the user PC 4 judges whether the "capture" button has been selected.

If a negative result is obtained, it means that the "capture" button has not been selected and operated, then the CPU 10 of the user PC 4 wait for the "capture" button to be selected and operated.

If an affirmative result is obtained at step SP1, on the contrary, it means that the "capture" button has been selected and operated, then the CPU 10 of the user PC 4 moves to next step SP2.

At step SP2, the CPU 10 of the user PC 4 takes in picture data of an image taken when the "capture" button is selected and operated, stores it in the hard disk 13 once, and moves to next step SP3.

At step SP3, the CPU 10 of the user PC 4 judges whether the user PC 4 is connected to the Internet 2. If a negative result is obtained at this time, it means that it is not connected to the Internet 2 yet. Then, the CPU 10 of the user PC 4 moves to next step SP5 to performs the connection processing to the Internet 2, and then moves to next step SP4.

If an affirmative result is obtained at step SP3, on the contrary, it means that the user PC 4 is connected to the Internet 2 already and then the CPU 10 of the user PC 4 moves to next step SP4.

At step SP4, the CPU 10 of the user PC 4 starts the connection processing to the streaming server 8 based on the previously registered URL (Uniform Resource Locator), and then moves to next step SP6.

The CPU 10 of the user PC 4 transmits previously stored user registration information to the reservation-for-server control center 5 at step SP6, the reservation-for-server control center 5 performs user registration confirmation, and transfers the picture data stored in the hard disk 13, to the streaming server 8 in the case where the confirmation result proves a proper user, and then the CPU 10 moves to next step SP7.

At step SP7 and step SP8, the CPU 10 of the user PC 4 takes in picture data of a taken image and transfers it to the streaming server 8 every time when the "capture" button is operated, until the connection to the Internet 2 is disconnected or a storage medium is changed.

The CPU 10 of the user PC 4 automatically performs the connection processing and the transfer processing of picture data to the streaming server 8 as described above, thereby the picture data of content can be stored in a memory of the streaming server 8 without user's special operations.

Next, the upload mode is a mode for allowing a user to check content taken in the aforementioned photographing mode, on the display 14, and for transmitting the picture data of the content to a predetermined streaming server 8 where the content should be uploaded, connected to the Internet 2. The CPU 10 displays an upload mode screen 51 as shown in FIG. 8(A) on the display 14.

This upload mode screen 51 has a GUI 72 and status window 73 as in the case of the photographing mode screen 50 (FIG. 6), and also has a preview area 74, a list display area 75 for displaying a plurality of main still pictures out of taken content in a line, and a transmission capsule icon 77 as new items.

Figure 8:
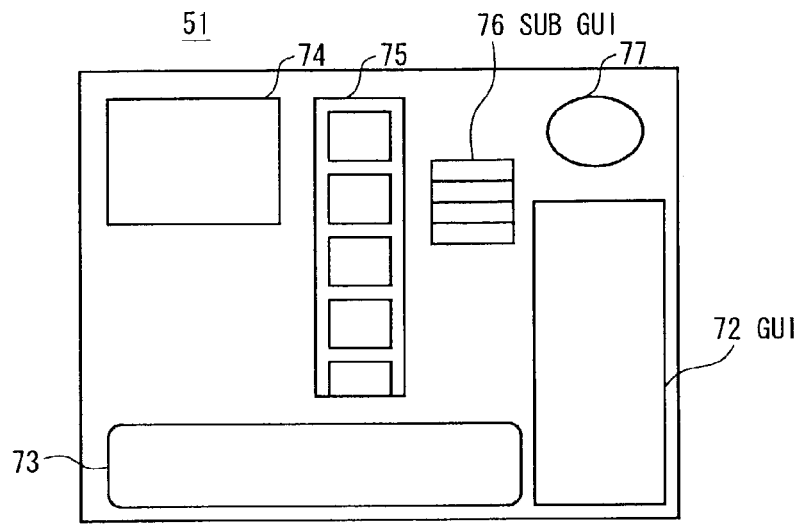
FIG. 8 is a schematic view showing the entire structure of an upload mode screen.
Figure 8:
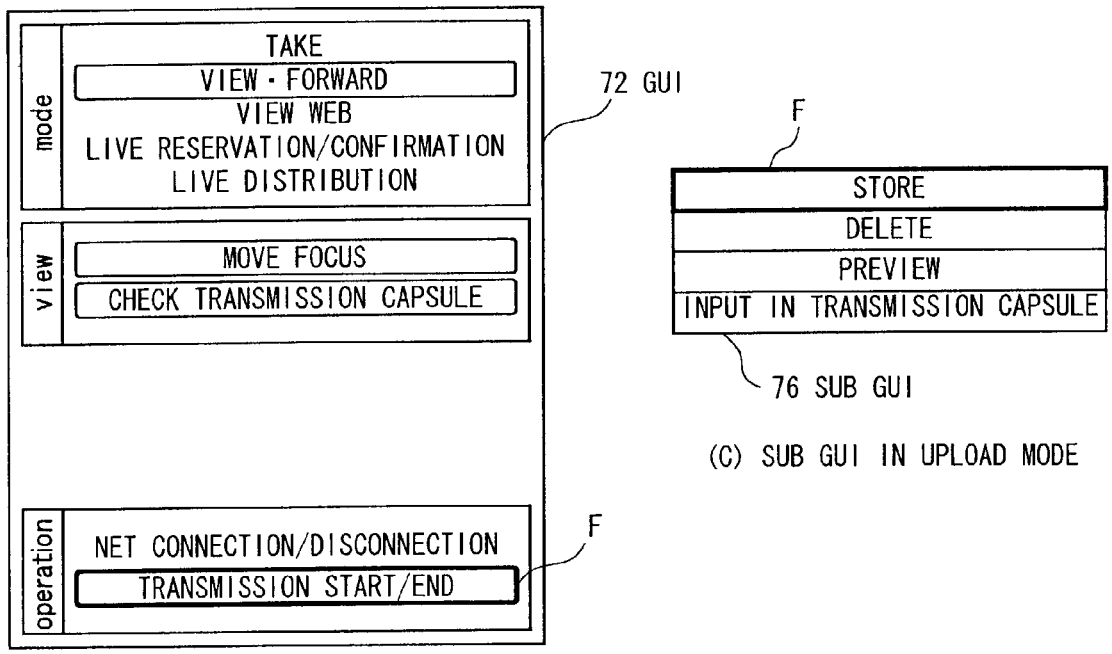

As shown in FIG. 8(B), there are an "operation" item and a "view" item in the GUI 72 of the upload mode screen 51, in addition to the "mode" item.

The "operation" item has a "net connect/disconnect" button for ordering connection/disconnection to/from the Internet 2, and a "transmission start/end" button for ordering start/end of the transmission of content, as lower-ranked items. Further, the "view" item has a "move focus" for moving the focus F to the list display area 75 and a "check transmission capsule" button for confirming the contents of the transmission capsule icon 77, that is, for checking a list of content selected for transmission by a user, as lower-ranked items.

Figure 6:
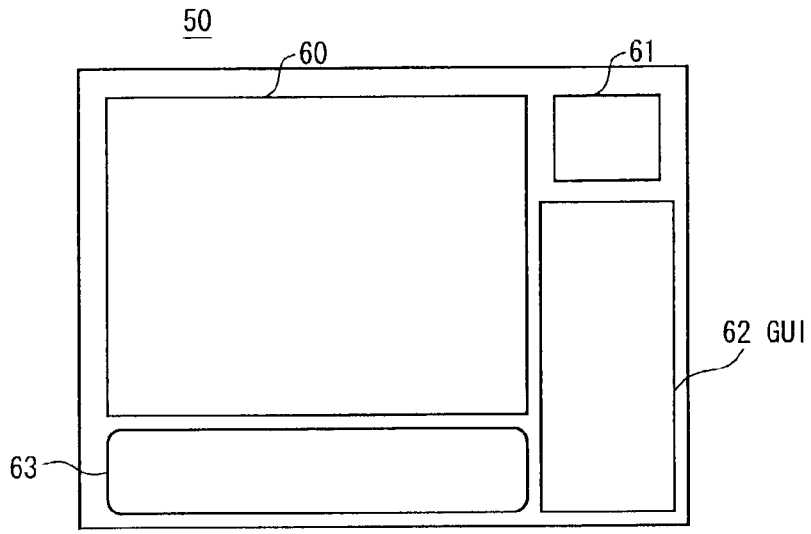
FIG. 6 is a schematic view showing the entire structure of a photographing mode screen.
Figure 6:
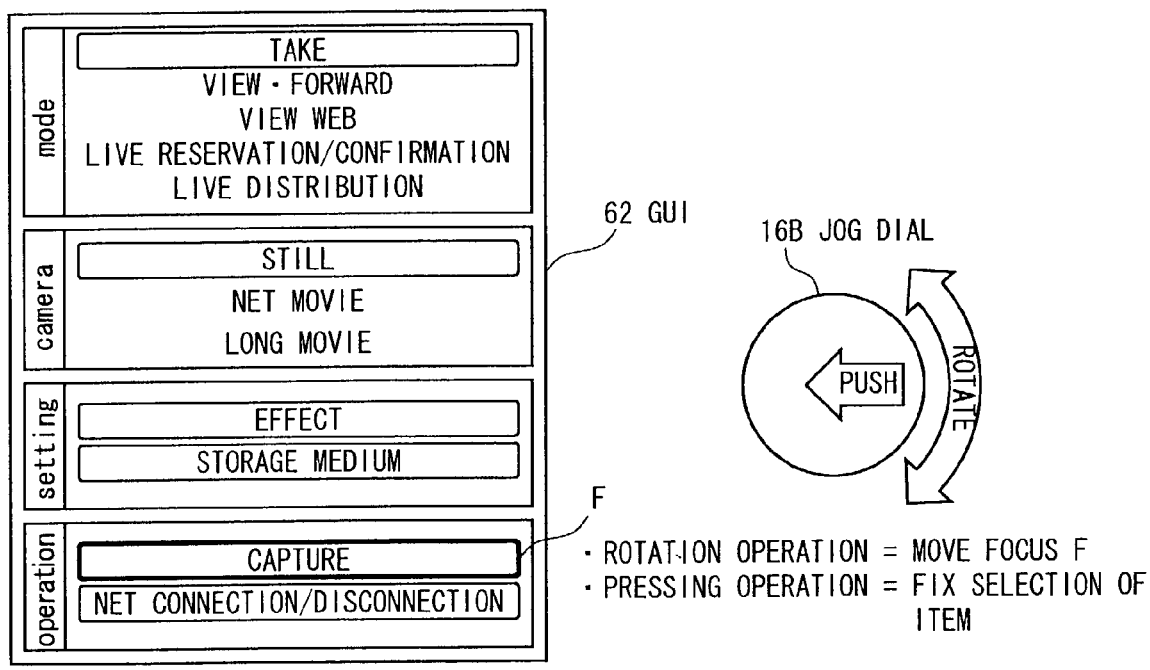

In this GUI 72, the focus F is moved to a desired lower-ranked item by turning the jog dial 16B on the display body 31A, and then the jog dial 16B is pressed, so that the lower-ranked item is selected and fixed, as in the case of the photographing mode screen 50 (FIG. 6).

Further, in the upload mode, commands for ordering reproduction/stop of content displayed in the preview area 74 and display of a still picture are previously assigned to the operating buttons 16C (FIG. 3 and FIG. 4), and the status window 73 displays a file name, file size and format (JPEG (Joint Photographic Experts Group), MPEG or the like) of picture data, and information about the currently designated destination of transmission (name of server of which data should be uploaded, and its URL).

When the CPU 10 recognizes that the focus F is moved to the "move focus" button through the user's turning operation of the jog dial 16B and then the "move focus" button is fixed through the pressing operation of the jog dial-16B, it moves the focus F on the list display area 75.

The user can move the focus F on a still picture in the list display area 75 by turning the jog dial 16B under such a condition that the focus F is placed on the list display area 75. Then, the user can easily select and determine a desired still picture as content to be transmitted, through the pressing operation of the jog dial 16B under such a condition that the focus F is placed on the desired still picture.

At this time, the CPU 10 displays the sub GUI 76 next to the list display area 75, and moves and displays the focus F on an item of the sub GUI 76 as shown in FIG. 8(C).

The sub GUI 76 has selectable buttons including a "store" button, a "delete" button, a "preview" button and an "input in transmission capsule" button. When the "input in transmission capsule" button is selected and fixed with the focus F through the turning operation and pressing operation of the jog dial 16B, the CPU 10 adds the content selected and fixed in the list display area 75, to a list of content to be transmitted in the transmission capsule icon 77.

Then, when the user returns the focus F to the GUI 72 and selects and fixes the "transmission start/end" button with the focus F, the CPU 10 transmits all of content including the content now added to the transmission capsule icon 77, to the streaming server 8 of which the content should be uploaded.

Next, the Web confirmation mode is a mode for performing browsing by connecting to the Internet 2. When the Web confirmation mode is selected, the CPU 10 displays the Web confirmation mode screen 52 as shown in FIG. 9(A) on the display 14.

This Web confirmation mode screen 52 has a GUI 82 and status window 83 as in the case of the photographing mode screen 50 (FIG. 6), and also has a browser display area 80 for displaying a Web browser and a URL display area 84 for displaying the URL of the resource being displayed in the browser display area 80 as new items.

When the Web confirmation mode is selected, the CPU 10 takes out and executes browser software (for example, Internet Explorer (Microsoft Corp.) or Netscape Navigator (Netscape Corp.)) from the hard disk 13, to display a browsing image in accordance with the browser software in the browser display area 80.

Further, as shown in FIG. 9(B), the GUI 82 of the Web confirmation mode screen 52 has a "browsing" item as a new item, instead of the "setting" item and "camera" item of the initial screen 35.

This "browsing" item has lower-ranked items including a "jump for reservation" button for jump to a predetermined Web page, a "next" button and "return" button for operating a browser. Note that, in the Web confirmation mode, it is possible to execute an ordinary browsing processing, like inputting an URL and performing browsing.

In this GUI 82, a desired lower-ranked item is selected and fixed by moving the focus F to the lower-ranked item through the turning operation of the jog dial 16B on the display body 31A and then pressing the jog dial 16B, as in the case where the photographing mode screen 50.

Next, the live reservation/confirmation mode is a mode for reservation for a time zone to perform personal broadcasting of content in live using the stream distribution function of the streaming server 8. When the live reservation/confirmation mode is selected, the CPU 10 displays a live reservation/confirmation mode screen 53 as shown in FIG. 10(A) on the display 14.

Figure 9:
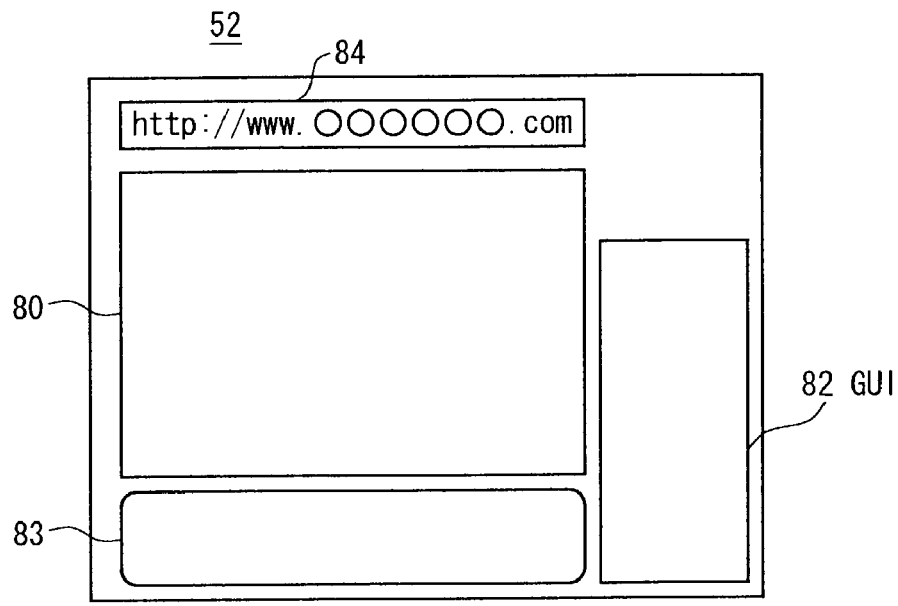
FIG. 9 is a schematic view showing the entire structure of a Web confirmation mode screen.
Figure 9:
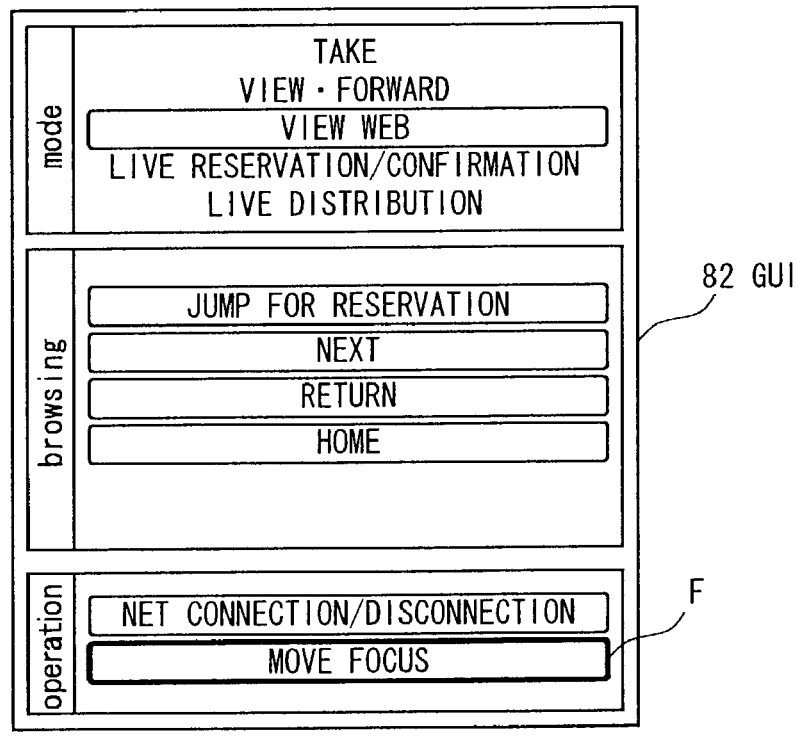

This live reservation/confirmation mode screen 53 has a reservation list display area 95 as a new item, in addition to the browser display area 90, the GUI 92, the status window 93 and the URL display area 94 similar to those of the Web confirmation mode screen 52 (FIG. 9).

Figure 10:
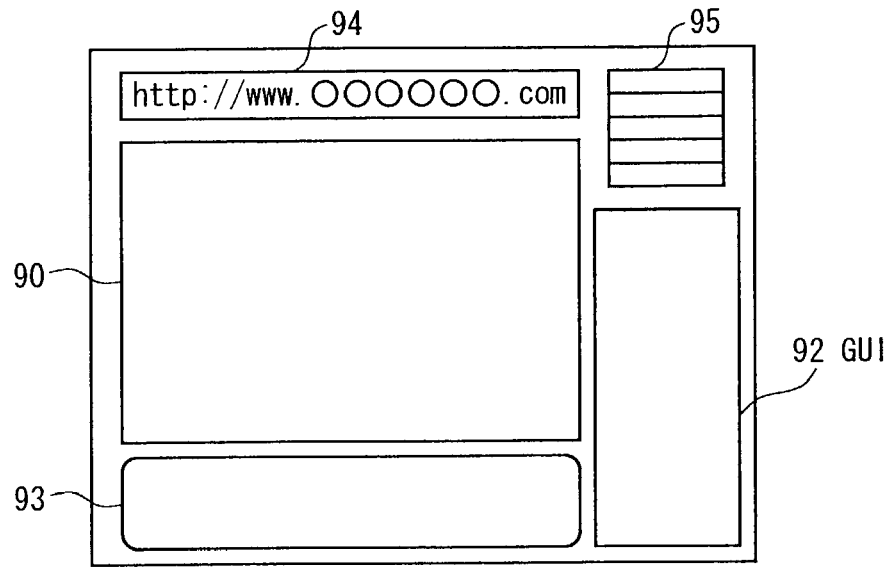
FIG. 10 is a schematic view showing the entire structure of a live reservation/confirmation mode screen.
Figure 10:
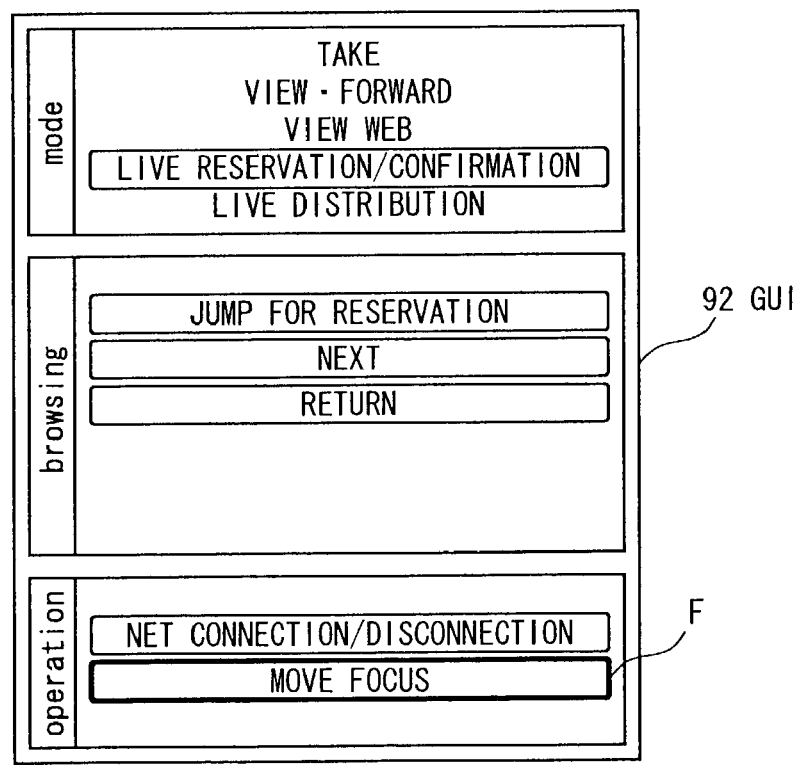

Further, as shown in FIG. 10(B), the GUI 92 of the live reservation/confirmation mode screen 53 has a "mode" item, the "operation" item and "browsing" item as in the case of the GUI 82 of the Web confirmation mode screen 52 (FIG. 9). The "browsing" item has a "jump for reservation" for jump to the Web page to make a reservation for live distribution, the "next" button and "return" button for operating a browser, and so on.

Further, in the GUI 92 also, a desired lower-ranked item is selected and fixed by moving the focus F to the lower-ranked item through the turning operation of the jog dial 16B on the display body 31A and then pressing the jog dial 16B, as in the case of the Web confirmation mode screen 52.

Note that, the Web page for making a reservation for live distribution is a Web page of a reservation screen for reservation for live distribution, which is stored in the hard disk of the live casting server, described later, in the reservation-for-server control center 5.

When the user selects and fixes the "jump for reservation" button with the focus F, the CPU 10 of the user PC 4 accesses the live casting server in the reservation-for-server control center 5, so as to transmit/receive various data relating to the reservation for live distribution, such as transmission of reservation request information to the live casting server or downloading of a live reservation setting information file from the live casting server.

In the reservation list display area 95 of the live reservation/confirmation mode screen 53 displays a list of reservation items of reservation for live distribution made to the reservation-for-server control center 5, and displays outline of information including a time zone, set for each reservation item.

When the user selects and fixes an arbitrary reservation item in the reservation list display area 95 with the focus F through the turning operation and pressing operation of the jog dial 16B, the CPU 10 of the user PC 4 controls the live casting server in the reservation-for-server control center 5 to jump the screen to a Web page of the reservation confirmation screen showing the reservation contents of the reservation item. The processing relating to the live reservation which is executed between the CPU 10 of the user PC 4 and the reservation-for-server control center 5 of this time will be described later.

Next, the live distribution mode is a mode for distributing content which is taken with the digital video camera 19 of the user PC 4, to the client PCs 7A, 7B and 7C by using the streaming distribution function of the streaming server 8 over the Internet in real time, as if it is the personal broadcasting.

In actual, when the user selects the live distribution mode, the CPU 10 of the user PC 4 displays a live distribution mode screen 54 shown in FIG. 11(A) on the display 14.

This live distribution mode screen 54 has a GUI 102, an effect list display area 105 showing various effects which should be applied to motion picture data of content when the live distribution is performed, a preview image display area 104 for displaying effect images to which special effects out of the various effects have been applied, and a current effect display area 106 for displaying what effects is actually being applied. It is noted that the effect images displayed in the preview image display area 104 are images of content to be actually transmitted to the streaming server 8.

The GUI 102 has an "effect list" button for moving the focus F to the effect list display area 105 and an "effect setting" button for setting various effects to be applied to motion picture data of content, as well as a "live distribution" button for switching to the live distribution mode, and a "live reservation confirmation" button for switching to the live reservation/confirmation mode.

In addition, the GUI 102 has a "net connection/disconnection" button for ordering the connection/disconnection to/from the Internet 2, a "distribution start/end" button for ordering the start/end of the live distribution, and a "pause" button for ordering pause of the live distribution.

Displayed under the preview display screen 104 A in the preview image display area 104 are the tile of the live content, on-air information in the form of "ONAIR" which means that the live distribution is currently performed, time information of the service provider side in the personal casting service, reserved time zone information showing the start time and end time of the live distribution, image size information, bit rate information showing the transmission rate (bit rate) of distribution data, and so on.

Further, in the case where any button out of the operating buttons 16C (FIG. 3 and FIG. 4) is taken as a button A and another button out of the remaining operating buttons 16C is taken as a button B, the effect list display area 105 is composed of a single-shot effect display area 105A on the left side for showing, in a line, single-shot effects which can be applied as special effects while the button A is pressed, and a continuous effect display area 105B on the right side for showing, in a line, continuous effects which can be continuously applied as special effects.

When the user wants to set single-shot effects and continuous effects in the single-shot effect display area 105A and the continuous effect display area 105B of the effect list display area 105, he just selects the "effect setting" button in the GUI 102.

Figure 12:
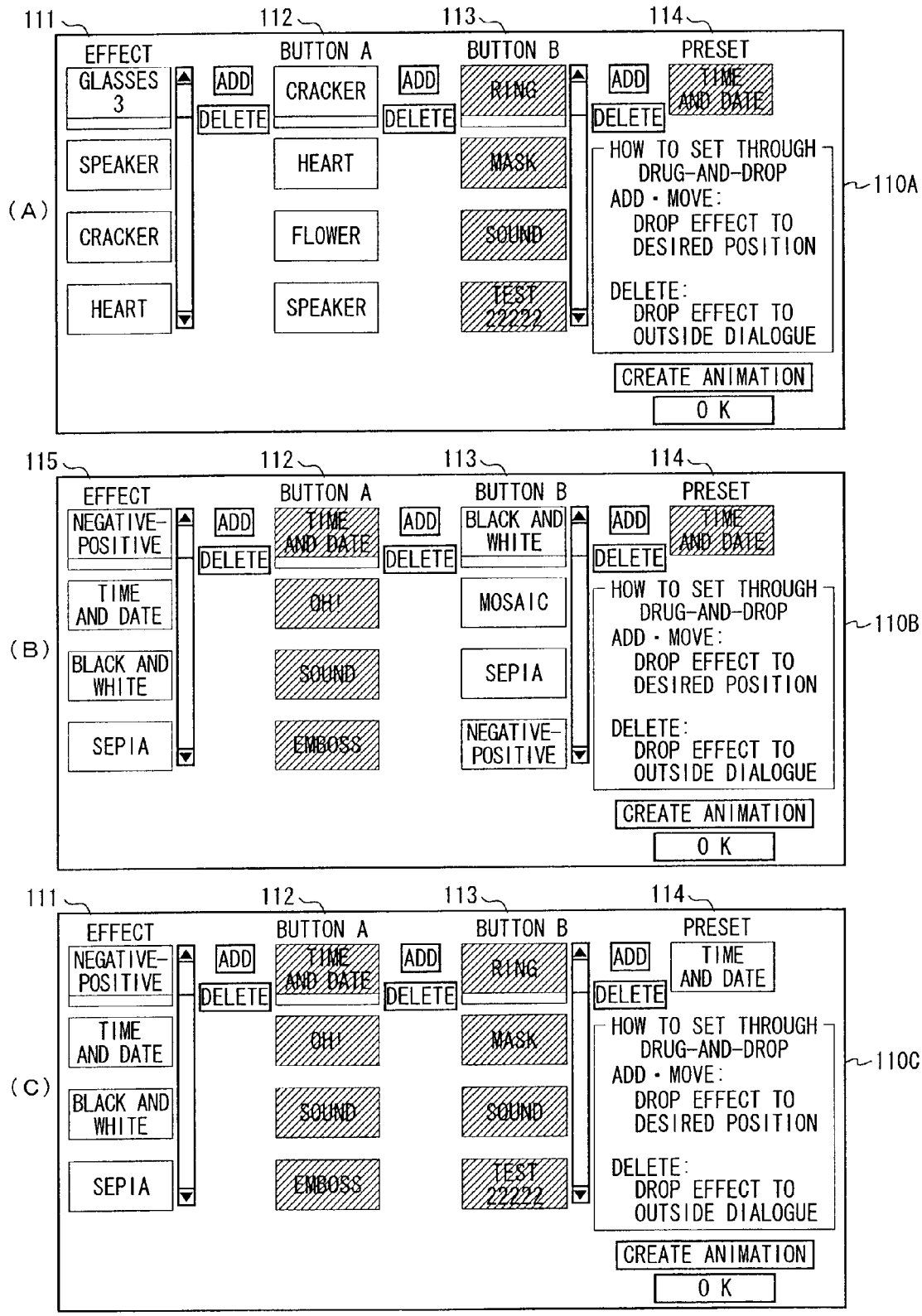
FIG. 12 is a schematic diagram showing an effect setting screen.

Specifically, when the "effect setting" button is clicked, the CPU 10 of the user PC 4 overlays and displays the live distribution mode screen 54 with an effect setting screen 110 shown in FIG. 12, in accordance with the application program.

With respect to the effect setting screen 110, a single-shot effect setting screen 110A for setting the kinds and the order of single-shot effects which are to be displayed in the single-shot effect display area 105A of the effect list display area 105, a continuous effect setting screen 110B for setting the kinds and the order of continuous effects which are to be displayed in the continuous effect display area 105B, and a preset effect setting screen 110C for setting a continuous effect to be applied as a special effect during distribution are switched.

When the single-shot effect setting screen 110A of the effect setting screen 110 is displayed, a plurality of selectable single-shot effects is displayed in a single-shot effect list area 111, and the user selects desired single-shot effects and drug-and-drops them to a single-shot effect setting area 112, to set the kinds and the order (this order is fixed from the top) of single-shot effects.

Note that, in the single-shot effect setting screen 110A, only the single-shot effect list area 111 is active and the continuous effect setting area 113 and the preset effect setting area 114 are subjected to the net-covering processing to prevent single-shot effects from being added to the continuous effect setting area 113 or the preset effect setting area 114.

Next, when the continuous effect setting screen 110B of the effect setting screen 110 is displayed, the continuous effect list area 115 shows a plurality of selectable continuous effects, and the user selects desired continuous effects and drug-and-drops them to the continuous effect setting area 113 to set the kinds and the order of continuous effects.

Note that, also in this continuous effect setting screen 10B, only the continuous effect list area 113 is active and the single-shot effect setting area 112 and the preset effect setting area 114 are subjected to the net-covering processing to prevent the continuous effects from being added to the single-shot effect setting area 112 or the preset effect setting area 114.

Next, the preset effect setting screen 110C of the effect setting screen 110 is displayed, the continuous effect list area 115 shows a plurality of selectable continuous effects, and the user selects a desired continuous effect and drug-and-drops it to the preset effect setting area 114 to set a preset effect. Note that, only one kind of preset effect (for example, effect for displaying "time and date") is set using the preset effect setting area 114.

Note that, also in the preset effect setting screen 110C, only the preset effect setting area 114 is active and the single-shot effect setting area 112 and the continuous effect setting area 113 are subjected to the net-covering processing, to prevent the continuous effect from being added to the single-shot effect setting 112 or the continuous effect setting area 113 as a preset effect.

Figure 11:
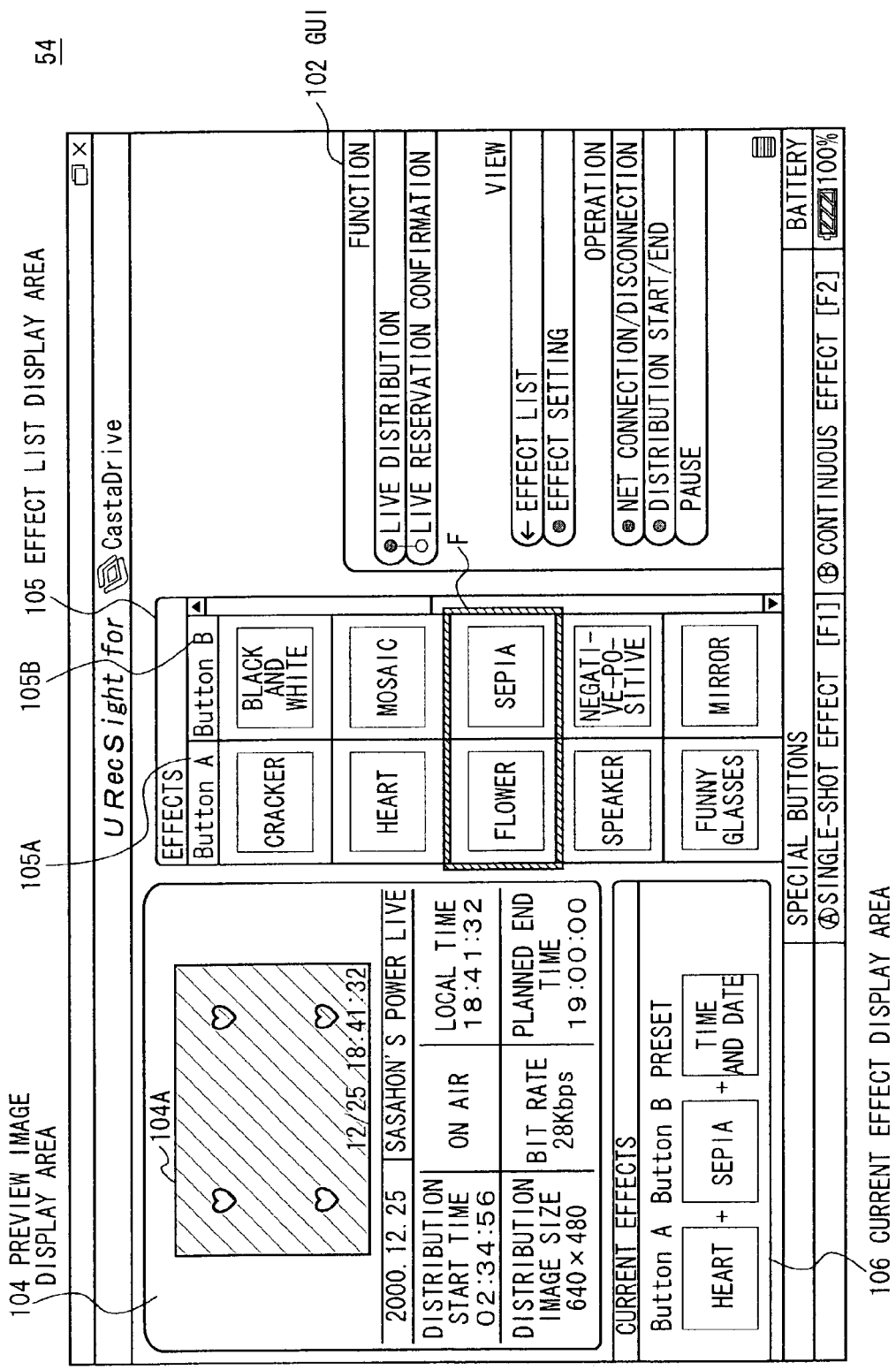
FIG. 11 is a schematic view showing the entire structure of a live distribution mode screen.

Single-shot effects, continuous effects, and a preset effect are set in the effect setting screen 110 as described above, the single-shot effects and the continuous effects are displayed in order in the single-shot effect display area 105A and the continuous effect display area 105B of the effect list display area 105 in the live distribution mode screen 54 (FIG. 11).

In this case, it is desirable that the orders of single-shot effects and continuous effects which are displayed in the single-shot effect display area 105A and the continuous effect display area 105B are set following a scenario which is used for photographing content, and the single-shot effects and the continuous effects are displayed in the single-shot effect display area 105A and the continuous effect display area 105B in order.

The kinds and the order of single-shot effects and continuous effects which are set in the single-shot effect display area 105A and the continuous effect display area 105B of the effect list display area 105 of the live distribution mode screen 54 in this way are recorded and stored in the hard disk 13.

Note that, with respect to this effect list display area 105 of the live distribution mode screen 54 (FIG. 11), the single-shot effects and the continuous effects have been already set in the single-shot effect setting area 105A and the continuous effect setting area 105B, and a single-shot effect and a continuous effect which are arranged side by side are simultaneously rotated and shifted in a combination manner according to the turning operation of the jog dial 16B.

It is noted that the focus F is fixed at a position shown in the figure and the single-shot effects and the continuous effects are simultaneously rotated and shifted behind the focus F with side-by-side effects as a pair according to the turning operation of the jog dial 16B.

In this way, effects which are to be applied as special effects are selected with the focus F according to the turning operation of the jog dial 16B, and when the button A or button B out of the operating buttons 16C is pressed while the effects are selected with the focus F, the CPU 10 of the user PC 4 applies a special effect corresponding to the pressed button A or button B to picture data of this time.

That is, the CPU 10 of the user PC 4 simultaneously rotates and shifts a single-shot effect and a continuous effect which are arranged side by side as a pair. As a result, when a pair of the single-shot effect and continuous effect is to be applied to picture data as special effects, effects can be selected in a short time because it is not necessary to turn the jog dial 16B.

The current effect list display area 106 of the live distribution mode screen 54 (FIG. 11) displays a single-shot effect selected with the focus F by pressing the button A, a continuous effect selected with the focus F by pressing the button B, and a preset effect set in the preset effect setting area 114, in order to allow the user to recognize what effects are selected at this point.

In addition, in the live distribution mode screen 54, not only a single-shot effect and a continuous effect which are arranged side by side as a pair and selected with the focus F can be applied as special effects, but also a single-shot effect and a continuous effect which are not arranged side by side can not be combined and applied as special effects.

For example, when the button B is pressed while a single-shot effect of "flower" and a continuous effect of "sepia" are selected with the focus F, the CPU 10 of the user PC 4 can apply the continuous effect of "sepia" and then, when a single-shot effect of "heart" and a continuous effect of "mosaic" are selected with the focus F through the turning operation of the jog dial 16B and the button A is pressed under this situation, it can apply the single-shot effect of "heart" accordingly.

Thereby, the single-shot effect of "heart" and the continuous effect of "sepia" is being applied in this case. As described above, a single-shot effect and a continuous effect can be applied even they are not arranged side by side as a pair.

However, the live distribution mode screen 54 finally shows the situation where the single-shot effect of "heart" and the continuous effect of "mosaic" are selected with the focus F, which may make the user misunderstand that the single-shot effect of "heart" and the continuous effect of "mosaic" selected by the focus F are applied as special effects.

Therefore, the CPU 10 of the user PC 4 displays a single-shot effect and a continuous effect indicating the kinds of special effects which are actually being applied to the picture data, in the current effect display area 106, irrespective of display of the single-shot effect and continuous effect selected with the focus F, to prevent the aforementioned misunderstanding.

Note that, the current display area 106 always displays not only the single-shot effect corresponding to the button A and the continuous effect corresponding to the button B, but also the preset effect which is to be continuously applied in distribution as a special effect, and displays "single-shot effect corresponding to the button A+continuous effect corresponding to the button B+preset effect" from the left, in order to make the user perceive the order of special effects to be applied to picture data too.

When the "distribution start/end" button is selected and fixed with the focus F through the turning operation and pressing operation of the jog dial 16B, the CPU 10 of the user PC 4 establishes a transmission path to the streaming server 8 by the dedicated circuit connection via the network for accessing server 6 or by the Internet connection via the Internet 2, according to the reservation setting information file for live distribution which is supplied from the live casting server in the reservation-for-server control center 5, in the aforementioned live reservation/confirmation mode.

Sequentially, the CPU 10 of the user PC 4 transmits motion picture data of content taken with the digital video camera 19 to the streaming server 8 in real time, based on the contents (data bit rate, etc, for example) set in the reservation setting information file.

Figure 13:
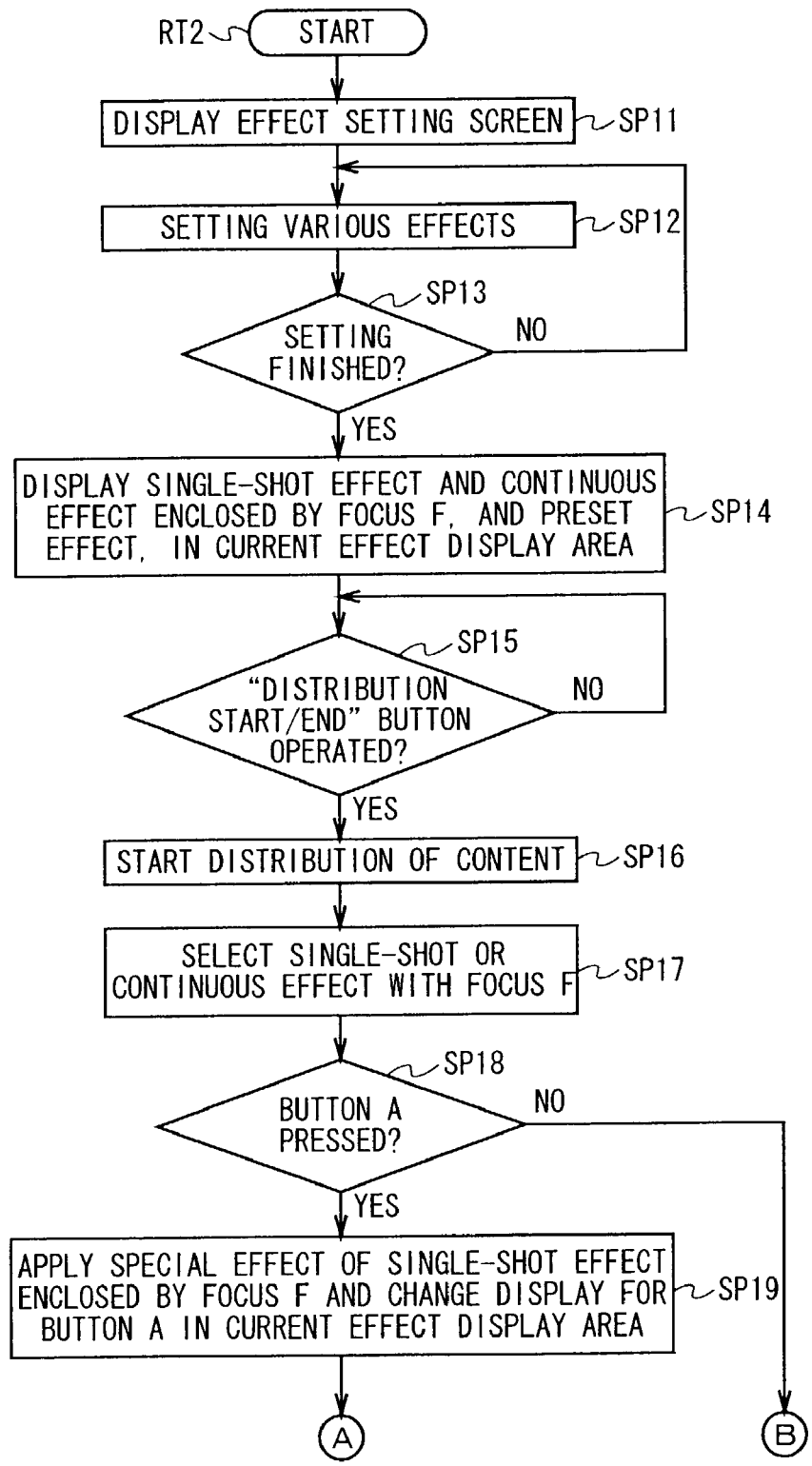
FIG. 13 is a flowchart showing a sequence (1) of content distribution processing.
Figure 14:
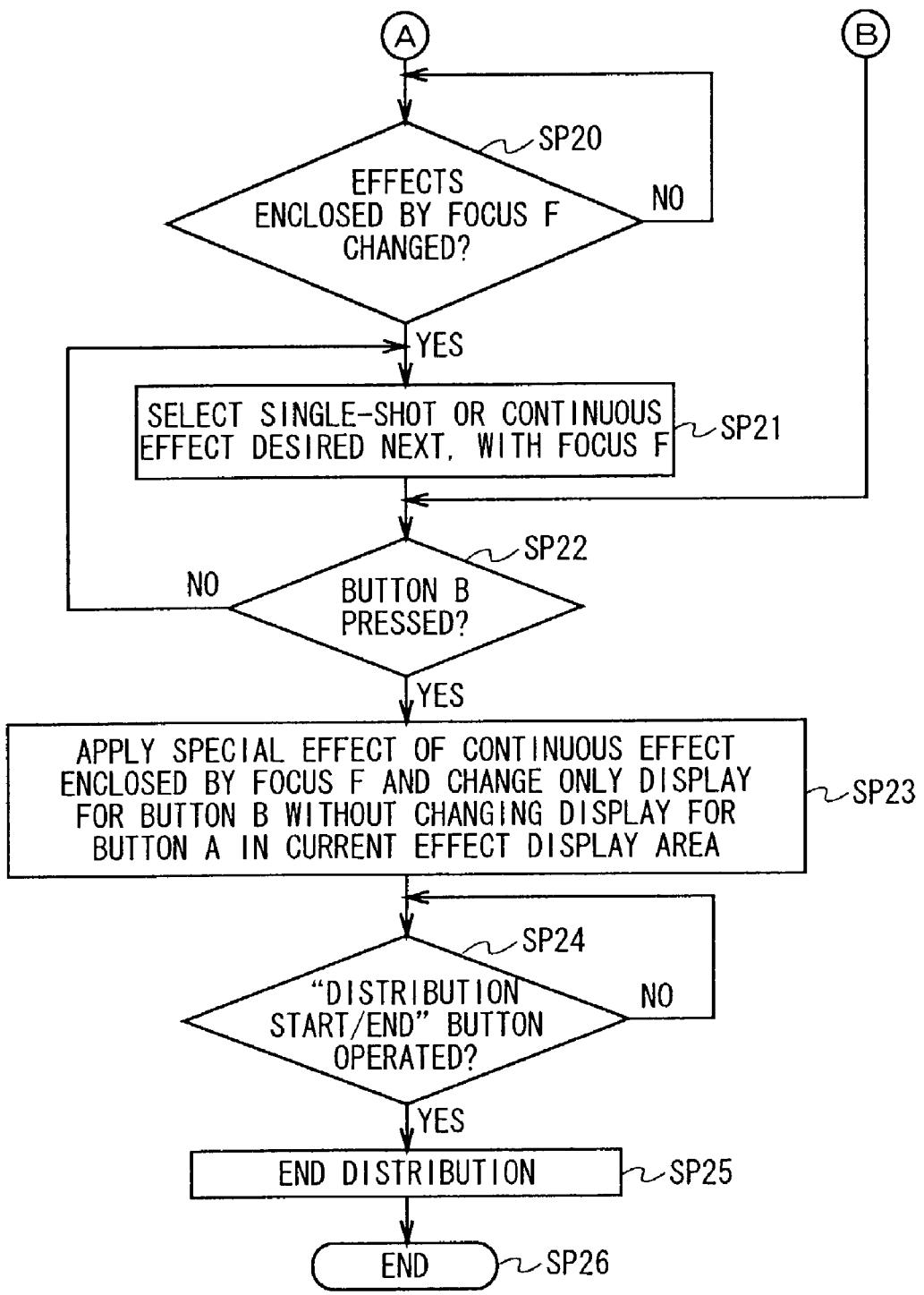
FIG. 14 is a flowchart showing a sequence (2) of content distribution processing.

In actual, in the case where the CPU 10 of the user PC 4 applies desired special effects to motion picture data of content and transmits the resultant to the streaming server 8, this processing is carried out in accordance with a sequence of the distribution processing of content shown in FIG. 13 and FIG. 14.

That is, the CPU 10 of the user PC 4 starts the routine RT2 at start step and moves to next step SP11. At step SP11, the CPU 10 of the user PC 4 displays the effect setting screen 110 (FIG. 12) when the "effect setting" button is selected in the live distribution mode screen 54 (FIG. 11), and then moves to next step SP12.

At step SP12, the CPU 10 of the user PC 4 performs setting of single-shot effects, continuous effects and a preset effect based on user operations on the effect setting screen 110, and then moves to next step SP13.

At step SP13, the CPU 10 of the user PC 4 judges whether setting of various effects has been finished. If a negative result is obtained here, which means the setting of various effects has not been finished yet, and then the CPU 10 of the user PC 4 returns to step SP12 to keep on setting various effects.

If an affirmative result is obtained at step SP13 on the contrary, which means that the setting of various effects has been finished, and then the CPU 10 of the user PC 4 moves to next step SP14.

Since the setting of various effects has been finished, the CPU 10 of the user PC 4 returns the screen from the effect setting screen 110 to the live distribution mode screen 54, to display sample images of a single-shot effect and continuous effect enclosed by the focus F at this point and a set preset effect, in the current effect display area 106 at step SP14, which makes the user recognize the kinds of effects being selected with the focus F, and then it moves to next step SP15.

At step SP15, the CPU 10 of the user PC 4 judges whether the "distribution start/end" button has been operated for the reserved time zone for the live distribution previously reserved in the live reservation/confirmation mode.

If a negative result is obtained here, which means that the "distribution start/end" button has not been operated yet, then the CPU 10 of the user PC 4 waits for the "distribution start/end" button to be operated.

If an affirmative result is obtained at step SP15 on the contrary, which means that the "distribution, start/end" button has been operated for the distribution start time at which the live distribution should be started, and then the CPU 10 of the user PC 4 moves to next step SP16.

At step SP16, the CPU 10 of the user PC 4 transmits picture data and audio data of content being taken, to the streaming server 8 via the public circuit, network 3 or via the network for accessing server 6, in response to the operation of the "distribution start/end" button, to start the live distribution of content via the streaming server 8, and moves to next step SP17.

At step SP17, the CPU 10 of the user PC 4 selects a single-shot effect or a continuous effect desired by the user, with the focus F in the effect list display area 105 through the turning operation of the jog dial 16B, and moves to next step SP18.

At step SP18, while the single-shot effect or the continuous effect is selected with the focus F, the CPU 10 of the user PC 4 judges whether the button A out of the operating buttons 16C has been pressed. If a negative result is obtained here, which means that the button A has not been pressed yet, and then the CPU 10 of the user PC 4 moves to next step SP21.

If an affirmative result is obtained at step SP18 on the contrary, which means that a command of applying a special effect of the single-shot effect enclosed by the focus F is inputted by pressing the button A, and then the CPU 10 of the user PC 4 moves to next step SP19.

At step SP19, the CPU 10 of the user PC 4 can apply the special effect of the single-shot effect, which is enclosed by the focus F, to the picture data in real time, and can display a sample image showing what single-shot effect is being applied, in an area corresponding to the button A in the current effect display area 106, and then moves to next step SP20.

At step SP20, the CPU 10 of the user PC 4 judges whether the single-shot effect and the continuous effect enclosed by the focus F has been changed by the turning operation of the jog dial 16B.

If a negative result is obtained here, which means that the single-shot effect and the continuous effect enclosed by the focus F has not been changed, and then the CPU 10 of the user PC 4 returns to the step SP20 to wait for the single-shot effect and the continuous effect enclosed by the focus F to be changed.

If an affirmative result is obtained at step SP20 on the contrary, which means that the single-shot effect and the continuous effect enclosed by the focus F has been changed, and then the CPU 10 of the user PC 4 moves to next step SP21.

At step SP21, the CPU 10 of the user PC 4 selects a single-shot effect or a continuous effect which is desired next, with the focus F under the user operations, and moves to next step SP22.

At step SP22, the CPU 10 of the user PC 4 judges whether the button B out of the operating buttons 16C has been pressed, while the next single-shot effect or continuous effect is selected by the focus F. If a negative result is obtained here, which means that the button B has not been pressed, and then the CPU 10 of the user PC 4 returns to step SP21 to select a single-shot effect or a continuous effect which is desired next, by the focus F.

If an affirmative result is obtained at step SP22 on the contrary, which means that a command of applying the special effect of the continuous effect enclosed by the focus F is inputted by pressing the button B, and then the CPU 10 of the user PC 4 moves to next step SP23.

At step SP23, the CPU 10 of the user PC 4 applies the special effect of the continuous effect enclosed by the focus F to the picture data, and also displays a sample image showing what continuous effect is being applied, in a place corresponding to the button B in the current effect display 106, and then moves to next step SP24. Note that, the CPU 10 of the user PC 4 applies the special effect of the single-shot effect while the button A is pressed, applies the special effect of the continuous effect until the distribution is finished after the button B is pressed, and continuously applies the special effect of the preset effect from the start of distribution to the end.

At step SP24, the CPU 10 of the user PC 4 judges whether the "distribution start/end" button has been operated. If a negative result is obtained, which means that the "distribution start/end" button has not been operated yet and the user intends to keep on distributing content, then the CPU 10 of the user PC 4 waits for the "distribution start/end" button to be operated.

If an affirmative result is obtained at step SP24 on the contrary, which means that the user intends to finish the distribution of content, then the CPU 10 of the user PC 4 moves to next step SP25.

At step SP25, the CPU 10 of the user PC 4 stops the transmission processing of content to the streaming server 8, and finishes the distribution of the content at next step SP26.

As described above, the CPU 10 of the user PC 4 selects single-shot effects and continuous effects preset in the order of scenario of content by the focus F, and applies the special effects of a single-shot effect and a continuous effect by pressing the button A and the button B, so that desired effects can be applied to picture data of content at desired timing in real time.

In addition, the CPU 10 of the user PC 4 displays a single-shot effect and a continuous effect which are almost simultaneously used, side by side as a pair, so that the user can quickly select a single-shot effect and a continuous effect which are to be almost simultaneously used.

In addition, the CPU 10 of the user PC 4 can arbitrarily select a single-shot effect and a continuous effect and apply them as special effects, not only selecting a pair of a single-shot effect and a continuous effect arranged side by side and enclosed by the focus F.

In this case, the CPU 10 of the user PC 4 displays a single-shot effect, a continuous effect, and a preset effect being applied as special effects, in the current effect display area 106, so that the user can visually recognize what effects are actually being applied, not effects being selected by the focus F.

In addition, the CPU 10 of the user PC 4 displays a single-shot effect, a continuous effect and a preset effect which are being applied as special effects, in the current effect display area 106, so that the user can visually confirm what effects are being applied at this time and can previously prevent different special effects from being applied.

(2) Operation and Effects

As described above, the CPU 10 of the user PC 4 selects a single-shot effect and a continuous effect which are set in the single-shot effect display area 105A and the continuous effect display area 105B of the effect list display area 105, with the focus F, and applies the special effects of the currently selected single-shot effect and continuous effect which are arranged side by side as a pair, by the pressing operation of the button A and the button B, so that desired effects can be applied to picture data of content at desired timing in real time.

In this point, the CPU 10 of the user PC 4 does not have a problem because the kinds of single-shot effect and continuous effect selected by the focus F are the same as the kinds of effects which are to be actually applied as special effects.

If a combination of single-shot effect and continuous effect to be applied as special effects are limited to ones arranged side by side as a pair, however, the CPU 10 of the user PC 4 has a bad usability and can not cope with various situations.

The CPU 10 of the user PC 4, however, can apply a special effect of "sepia" by pressing the button B corresponding to the continuous effect of "sepia" selected by the focus F and at the same time, can apply a special effect of "heart" by pressing the button A corresponding to the single-shot effect of "heart" selected next by the focus F through the turning operation of the jog dial 16B.

However, since enclosed by the focus F at this point are the single-shot effect of "heart" and the continuous effect of "mosaic", the focus F makes the user misunderstand that the single-shot effect of "heart" and the continuous effect of "mosaic" are currently applied.

The CPU 10 of the user PC 4, however, displays a single-shot effect, a continuous effect, and a preset effect which are actually applied as special effects in the current effect display area 106, so that the content provider can recognize what special effects are actually being applied, without wondering due to the indication by the focus F.

As described above, in the case where the CPU 10 of the user PC 4 selects and applies a combination of effects other than a combination of a single-shot effect and a continuous effect which are set to be arranged side by side as a pair in the effect list display area 105 of the live distribution mode screen 54, with the focus F, sample images of the single-shot effect, the continuous effect and the preset effect which are actually applied are displayed in the current effect display area 106, so that the user can perceive and visually recognize what single-shot effect and continuous effect are actually applied as special effects, without wondering due to the single-shot effect and continuous effect enclosed by the focus F, thus previously preventing different effects from being selected.

(3) Other Embodiments

Note that, the aforementioned embodiment has described the case where special effects are applied to only picture data of content being taken. This invention, however, is not limited to this and special effects may be applied to picture data of content after photographing or special effects may be applied when editing. It is noted that picture data after special effects are applied may be recorded in the hard disk 13, videotape or the like.

Further, the aforementioned embodiment has described the case where single-shot effects and continuous effects are displayed in each line, in two lines in total, in the effect list display area 105 of the live distribution mode screen 54. This invention, however, is not limited to this and the single-shot effects and the continuous effects may be displayed in another display form, such as arranging in a horizontal direction, vertically arranging in three or more lines, or arranging in a circle form, as long as they are arranged and displayed in an order of scenario.

Still further, the aforementioned embodiment has described the case where the present invention is applied to the user PC 4 which is a personal computer with a photographing function. This invention, however, is not limited to this and may be widely applied to electronic devices which can apply effects to picture data inputted via personal computers, video cameras and the like.

Figure 15:
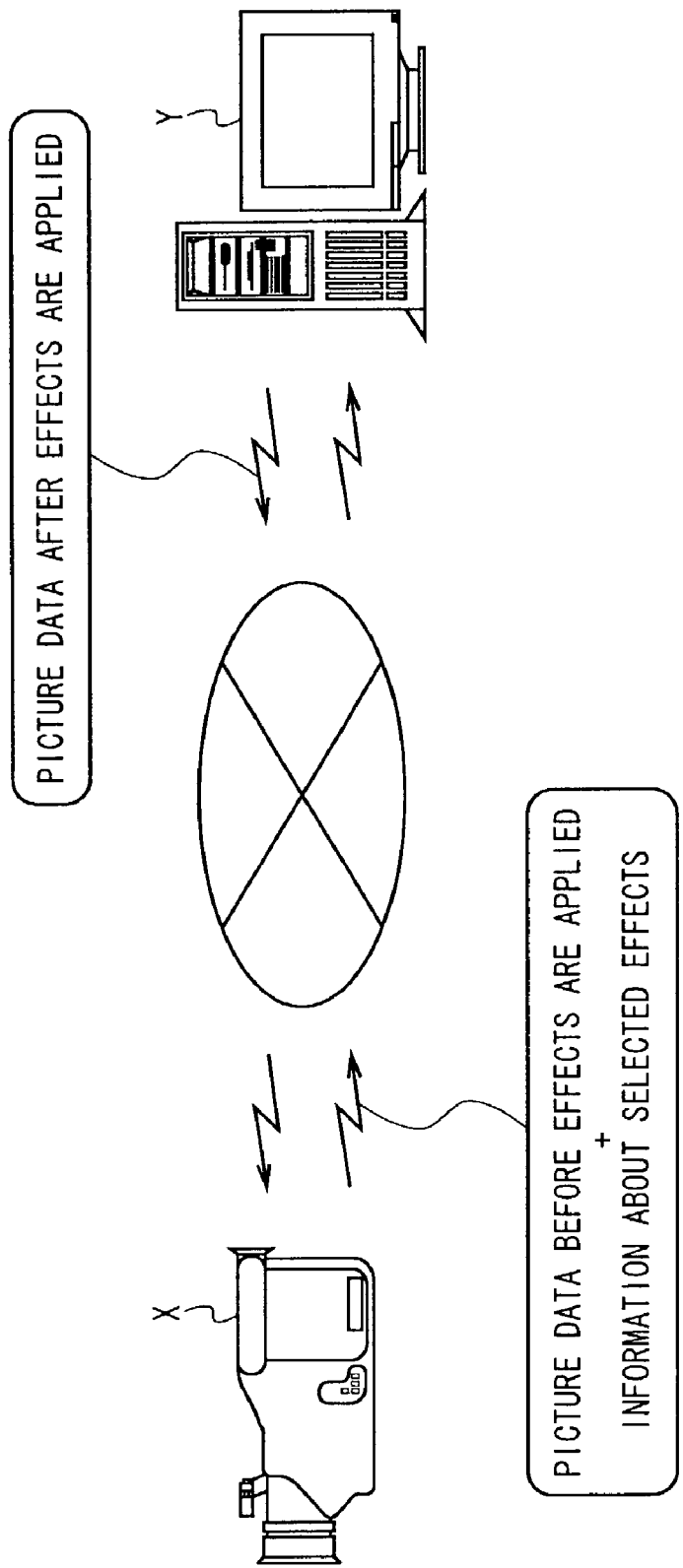
FIG. 15 is a schematic diagram showing an example of another embodiment where an electronic device applies effects.

When another electronic device applies effects, an electronic device may transmit picture data of the time when effects are not applied yet, to the another device and then inform the device of information about what effects are to be applied. In this case, as shown in FIG. 15, for example, an electronic device without an effect apply function can be taken as a video camera X and another device which applies effects can be taken as a server Y connected via the network.

Still further, the application programs for applying special effects such as applying effects as described above may be recorded in a program storage medium including a semiconductor memory unit such as a ROM or an IC card, an optical storage medium such as a CD (Compact Disk), a DVD (Digital Versatile Disk), or an MO (Magneto Optical), and a magnetic recording medium such as a FD (Flexible Disk) or a HD (Hard Disk). As a means for storing application programs in such a program storage medium, a wired- or radio-communication medium such as a local area network, the Internet, a digital satellite broadcasting may be utilized, and storing may be performed via another kind of communication interface such as a router or a modem.

According to the present invention, an effect applying device, an effect applying method, an effect applying program and an effect applying program storage medium can be realized, which can display effect specifying information for specifying effects for images in the order of use, so that the user can easily and quickly select desired effects and also easily and quickly apply desired effects to input images at desired timing.

INDUSTRIAL UTILIZATION

The effect applying device, effect applying method, effect applying program and effect applying program storage medium of the present invention are applied to a personal computer which applies effects to images in real time, for example.

The invention claimed is:

1. An effect applying device comprising:
display means for displaying various items of information;
effect specifying information arranging means for displaying effect specifying information which specifies effects for images, in a preset arrangement on said display means;
selecting means for selecting desired effect specifying information out of said effect specifying information displayed on said display means by said effect specifying information arranging means; and
effect applying means for applying effects specified by said desired effect specifying information selected by said selecting means, to input images, wherein,
said effect specifying information arranging means displays the arrangement of said effect specifying information in plural lines,
the arrangement of said effect specifying information includes a first arrangement for specifying short-term effects which can be applied for specified time, and a second arrangement for specifying continuous effects which can be continuously applied, and when said first arrangement for specifying short-term effects is selected only a short-term effect area is active and a continuous effect setting area is inactive and not able to be selected.

2. The effect applying device according to claim 1, comprising operating means for entering operator's operations, and wherein said effect specifying information arranging means displays a part of the arrangement of said effect specifying information, and scroll-displays the arrangement according to operation of said operating means.

3. The effect applying device according to claim 1, wherein said selecting means comprises:

first selecting means for selecting one item of effect specifying information out of each of the first arrangement and the second arrangement en bloc; and second selecting means for selecting one item of effect specifying information out of said effect specifying information selected by said first selecting means en bloc.

4. The effect applying device according to claim 3, wherein:

said first selecting means selects, en bloc, said effect specifying information which are arranged side by side in a row in the first arrangement and the second arrangement; and said second selecting means selects said effect specifying information in one line out of said effect specifying information selected en bloc, from either the first arrangement or the second arrangement.

5. The effect applying device according to claim 1, wherein said effect applying device comprises arrangement setting means for selecting one or more effects out of preset plural effects based on operator's operations and for setting the arrangement of the effect specifying information specifying said selected effects.

6. The effect applying device according to claim 4, wherein said effect applying device comprises effect specifying informing means for displaying a kind informing screen for showing kinds of two items of effect specifying information which are arranged in different rows, on said display means, when the effect specifying information in one line is selected by said second selecting means out of the effect specifying information which are arranged side by side in one row and are selected by said first selecting means en bloc, and the effect specifying information in a line different from the one line is selected by said second selecting means out of effect specifying information in a row different from the one row selected next by said first selecting means en bloc, in order to make the operator recognize the kinds of two items of effect specifying information of which the effects are applied by said effect applying means.

7. An effect applying method comprising:

an arrangement display step of displaying effect specifying information for specifying effects for images in a preset arrangement;

a selecting step of selecting desired effect specifying information out of said displayed effect specifying information; and an effect applying step of applying effects specified by said selected effect specifying information, to input images, wherein, said arrangement display step is to display the arrangement of said effect specifying information in plural lines, the arrangement of said effect specifying information includes a first arrangement for specifying short-term effects which can be applied for specified time, and a second arrangement for specifying continuous effects which can be continuously applied, and when said first arrangement for specifying short-term effects is selected only a short-term effect area is active and a continuous effect setting area is inactive and not able to be selected.

8. An effect applying method wherein:

a terminal is configured to perform steps of:

an arrangement display step of displaying effect specifying information for specifying effects for images in a preset arrangement;

a selecting step of selecting desired effect specifying information out of said displayed effect specifying information; and a transmission step of transmitting input images to a predetermined server via a network and informing said server of said selected effect specifying information; and said server comprises an effect applying step of applying effects specified by said selected effect specifying information to said input images, wherein, said arrangement display step is to display the arrangement of said effect specifying information in plural lines, the arrangement of said effect specifying information includes a first arrangement for specifying short-term effects which can be applied for specified time, and a second arrangement for specifying continuous effects which can be continuously applied, and when said first arrangement for specifying short-term effects is selected only a short-term effect area is active and a continuous effect setting area is inactive and not able to be selected.

9. The effect applying method according to claim 7, wherein said arrangement display step is to display a part of the arrangement of said effect specifying information and to scroll-display said arrangement based on operator's operations.

10. The effect applying method according to claim 7, wherein said selecting step comprises:

a first selecting step of selecting one item of effect specifying information from each of the first arrangement and the second arrangement en bloc; and a second selecting step of selecting one item of effect specifying information out of said effect specifying information selected at said first selecting step en bloc.

11. The effect applying method according to claim 10, wherein:

said first selecting step is to select said effect specifying information which are arranged side by side in one row in the first arrangement and the second arrangement en bloc; and said second selecting step is to select said effect specifying information in one line out of said effect specifying information selected en bloc, from either the first arrangement or the second arrangement.

12. The effect applying method according to claim 7, comprising an arrangement setting step of selecting one or more effects out of preset effects for images based on operator's operations and of setting the arrangement of the effect specifying information specifying said selected effects.

13. The effect applying method according to claim 7, wherein said effect applying method comprises
an effect specifying information informing step of displaying a kind informing screen for showing the kinds of two items of effect specifying information which are arranged in different rows, on the display means, when the effect specifying information in one line is selected at said second selecting step out of the effect specifying information which are arranged side by side in one row and are selected at said first selecting step en bloc, and the effect specifying information in a different line from the one line is selected at said second selecting step out of effect specifying information which are arranged in another row and are selected next at said first selecting step en bloc, in order to make the operator recognize the kinds of two items of effect specifying information of which the effects are applied by said effect applying means.

14. An effect applying computer program product for storing instructions for execution by a processor, which when executed by the processor, causes the processor to apply an effect, said effect applying computer program product comprising:
an arrangement display step of displaying effect specifying information for specifying effects for images in a preset arrangement;
a selecting step of selecting desired effect specifying information out of the displayed effect specifying information; and
an effect applying step of applying effects specified by the selected effect specifying information, to input images, wherein,
said arrangement display step is to display the arrangement of said effect specifying information in plural lines,
the arrangement of said effect specifying information includes a first arrangement for specifying short-term effects which can be applied for specified time and a second arrangement for specifying continuous effects which can be continuously applied, and
when said first arrangement for specifying short-term effects is selected only a short-term effect area is active and a continuous effect setting area is inactive and not able to be selected.

15. The effect applying computer program product according to claim 14, wherein said arrangement display step is to display a part of the arrangement of said effect specifying information and to scroll-display the arrangement based on operator's operations.

16. The effect applying computer program product according to claim 14, wherein said selecting step comprises:
a first selecting step of selecting one item of effect specifying information out of each of the first arrangement and the second arrangement en bloc; and
a second selecting step of selecting one item of effect specifying information out of the effect specifying information selected at said first selecting step en bloc.

17. The effect applying computer program product according to claim 16, wherein said first selecting step is to select the effect specifying information which are arranged side by side in one row in the first arrangement and the second arrangement, en bloc; and
said second selecting step is to select the effect specifying information in one line out of said effect specifying information selected en bloc, from either the first arrangement or the second arrangement.

18. The effect applying computer program product according to claim 14, comprising
an arrangement setting step of selecting one or more effects out of preset effects for images based on operator's operations, and of setting the arrangement of effect specifying information specifying said selected effects.

19. The effect applying computer program product according to claim 14, comprising
an effect specifying information informing step of displaying a kind informing screen for showing the kinds of two items of effect specifying information in different rows, on the display means, when the effect specifying information in one line is selected at said second selecting step out of the effect specifying information which are arranged side by side in one row and are selected at said first selecting step en bloc and effect specifying information in a different line from the one line is selected at said second selecting step out of effect specifying information in a different row from the one row which are selected next at said second selecting step en bloc, in order to make the operator recognize the kinds of two items of effect specifying information of which the effects are applied by said effect applying means.

* * * * *